(12) United States Patent
Liu et al.

(10) Patent No.: US 8,803,410 B2
(45) Date of Patent: *Aug. 12, 2014

(54) FIELD EMISSION DEVICE HAVING ENTANGLED CARBON NANOTUBES BETWEEN A CARBON NANOTUBE LAYER AND CARBON NANOTUBE ARRAY

(71) Applicants: Tsinghua University, Beijing (CN); Hon Hai Precision Industry Co., Ltd., New Taipei (TW)

(72) Inventors: Peng Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,434

(22) Filed: Dec. 11, 2012

(65) Prior Publication Data

US 2013/0293090 A1 Nov. 7, 2013

(30) Foreign Application Priority Data

May 4, 2012 (CN) .......................... 2012 1 0135961

(51) Int. Cl.
*H01J 19/24* (2006.01)
*H01J 19/38* (2006.01)

(52) U.S. Cl.
USPC ............ 313/302; 313/310; 977/742; 977/939

(58) Field of Classification Search
USPC ....... 313/309–311, 336, 346 R, 346 DC, 351, 313/495–497, 302; 977/939
See application file for complete search history.

(56) References Cited

U.S. PATENT DOCUMENTS

| 2006/0192475 A1* | 8/2006 | Lee et al. ...................... 313/495 |
| 2008/0170982 A1* | 7/2008 | Zhang et al. ............... 423/447.3 |
| 2012/0161608 A1* | 6/2012 | Liu et al. ................... 313/346 R |

OTHER PUBLICATIONS

U.S. Appl. No. 13/711,469.*

* cited by examiner

*Primary Examiner* — Nimeshkumar Patel
*Assistant Examiner* — Steven Horikoshi
(74) *Attorney, Agent, or Firm* — Novak Druce Connolly Bove + Quigg LLP

(57) ABSTRACT

The present disclosure relates to a field emission device. The field emission device includes a carbon nanotube structure and two electrodes electrically connected with the carbon nanotube structure. The carbon nanotube structure includes a carbon nanotube array, a carbon nanotube layer located on one side of the carbon nanotube array, and a carbon nanotube cluster between the carbon nanotube array and the carbon nanotube layer. The carbon nanotube array includes a number of first carbon nanotubes that are parallel with each other. The carbon nanotube layer includes a number of second carbon nanotubes. The carbon nanotube cluster includes a plurality of third carbon nanotubes that are entangled around both the plurality of first carbon nanotubes and the plurality of second carbon nanotubes.

20 Claims, 28 Drawing Sheets

US 8,803,410 B2

FIELD EMISSION DEVICE HAVING ENTANGLED CARBON NANOTUBES BETWEEN A CARBON NANOTUBE LAYER AND CARBON NANOTUBE ARRAY

CROSS-REFERENCE TO RELATED APPLICATIONS

This application claims all benefits accruing under 35 U.S.C. §119 from China Patent Applications: Application No. 201210135961.4 filed on May 4, 2012 in the China intellectual Property Office, disclosures of which are incorporated herein by references. This application is related to applications entitled, "METHOD FOR MAKING CARBON NANOTUBE STRUCTURE", filed on Dec. 11, 2012, with application Ser. No. 13/711,465; "CARBON NANOTUBE STRUCTURE", filed 2012 Dec. 11, 2012, with application Ser. No. 13/711,469.

BACKGROUND

1. Technical Field

The present disclosure relates to carbon nanotube structures, methods for making the same and field emission devices using the same.

2. Description of Related Art

Carbon nanotubes produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). Carbon nanotubes also feature extremely high electrical conductivity, very small diameters (much less than 100 nanometers), large aspect ratios, and a tip-surface area near the theoretical limit. These features tend to make carbon nanotubes ideal candidates for electron emitter in field emission device.

In US20060192475A1 published on Aug. 31, 2006, Li et al. discloses a carbon nanotube emitter and its fabrication method. The carbon nanotube emitter includes a plurality of first carbon nanotubes arranged on a substrate and in parallel with the substrate, and a plurality of the second carbon nanotubes arranged on a surface of the first carbon nanotubes. The method for making the carbon nanotube emitter includes: growing a plurality of first carbon nanotubes on a first substrate having a catalyst material layer arranged thereon; separating the first carbon nanotubes from the first substrate and immersing the first separated carbon nanotubes in a dispersion solution; coating a second substrate with the dispersion solution and baking the second coated substrate at a predetermined temperature to fix the first carbon nanotubes on the second substrate and in parallel with the second substrate; and growing a plurality of second carbon nanotubes from a plurality of nano catalyst particles on the surface of the first carbon nanotubes.

However, the method for making the carbon nanotube emitter is complicated and the combination force between the first carbon nanotubes and the second carbon nanotubes are week. Thus, the carbon nanotubes of the carbon nanotube emitter are easy to be pulled out when it is used in field emission device.

What is needed, therefore, is to provide a carbon nanotube structure in which the carbon nanotubes are firmly fixed and not easy to be pulled out, and a simple method for making the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present carbon nanotube structures and methods for making the same.

Figure 1:
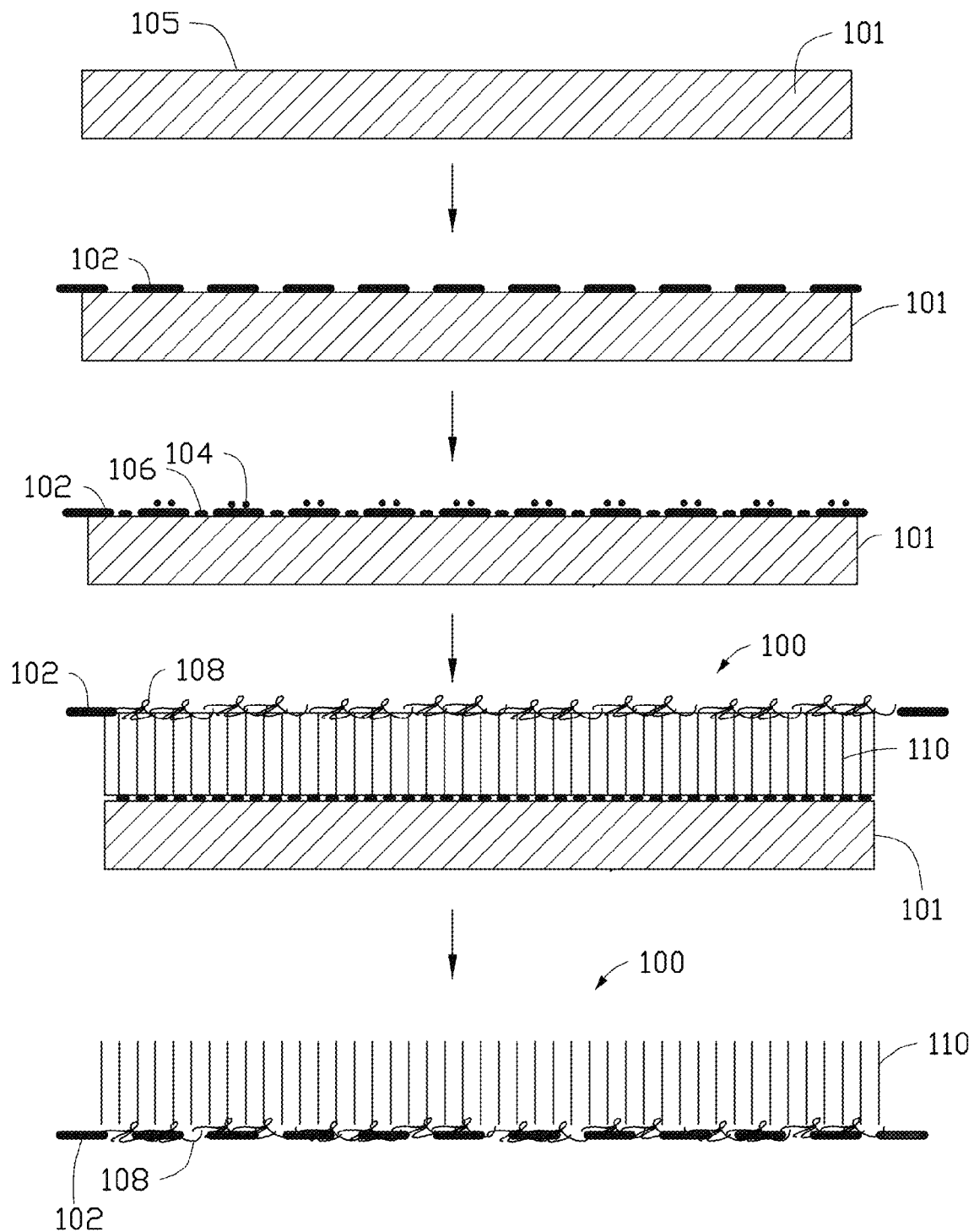
FIG. 1 is a flowchart of one embodiment of a method for making a carbon nanotube structure.

Referring to FIG. 1, a method for making a carbon nanotube structure 100 of one embodiment includes the following steps:

step (S11), providing a substrate 101 having an growing surface 105;

step (S12), placing a carbon nanotube layer 102 on the growing surface 105 of the substrate 101, wherein part of the growing surface 105 is exposed through the carbon nanotube layer 102;

step (S13), depositing a plurality of first catalysts 104 on surface of the carbon nanotube layer 102 and depositing a plurality of second catalysts 106 on the growing surface 105; and step (S14), growing a carbon nanotube array 110 on the growing surface 105 and growing a carbon nanotube cluster 108 on the surface of the carbon nanotube layer 102.

In step (S11), the substrate 101 has a growing surface 105 that is a clean and smooth surface. The growing surface 105 can be flat or curved. The growing surface 105 can be mechanically polished or electrochemically polished. A smoothness of the growing surface 105 can be less than 300 nanometers for facilitating a uniform formation of a catalyst layer directly on the substrate 101. The substrate 101 can be a silicon substrate, a silicon dioxide substrate, a quartz substrate, a sapphire substrate, or a ceramic substrate. The size, thickness, and shape of the substrate 101 can be selected according to need. In one embodiment, the substrate 101 is a silicon wafer with a size of 4-inch.

In step (S12), the carbon nanotube layer 102 is placed on and in contact with the growing surface 105 of the substrate 101. The carbon nanotube layer 102 is an integrated macro-structure in layer shape. The carbon nanotube layer 102 is a free-standing structure. The term "free-standing structure" includes, but is not limited to, the fact that the carbon nanotube layer 102 can sustain the weight of itself when it is hoisted by a portion thereof without any significant damage to its structural integrity. Thus, the carbon nanotube layer 102 can be suspended by two spaced supports. The free-standing carbon nanotube layer 102 can be laid on the growing surface 105 directly and easily.

The carbon nanotube layer 102 includes a plurality of carbon nanotubes. The carbon nanotubes in the carbon nanotube layer 102 can be single-walled, double-walled, or multi-walled carbon nanotubes. The length and diameter of the carbon nanotubes can be selected according to need. The thickness of the carbon nanotube layer 102 can be in a range from about 1 nanometer to about 100 micrometers. For example, the thickness of the carbon nanotube layer 102 can be about 10 nanometers, 100 nanometers, 200 nanometers, 1 micrometer, 10 micrometers, or 50 micrometers.

The carbon nanotube layer 102 forms a patterned structure, therefore, part of the growing surface 105 can be exposed from the patterned carbon nanotube layer 102 after the carbon nanotube layer 102 is placed on the growing surface 105. The carbon nanotube layer 102 can be a substantially pure structure of carbon nanotubes, with few impurities and chemical functional groups. The heat capacity per unit area of the carbon nanotube layer 102 can be less than $2 \times 10^{-4}$ J/m$^2$*K. In one embodiment, the heat capacity per unit area of the carbon nanotube layer 102 is less than or equal to $1.7 \times 10^{-6}$ J/m$^2$*K.

The patterned carbon nanotube layer 102 defines a plurality of apertures. The apertures can be dispersed uniformly. The aperture extends throughout the carbon nanotube layer 102 along the thickness direction thereof. The aperture can be a hole defined by several adjacent carbon nanotubes, or a gap defined by two substantially parallel carbon nanotubes and extending along axial direction of the carbon nanotubes. The hole shaped aperture and the gap shaped aperture can exist in the patterned carbon nanotube layer 102 at the same time. Hereafter, the size of the aperture is the diameter of the hole or width of the gap. The sizes of the apertures can be different. The average size of the apertures can be in a range from about 2 nanometers to about 100 micrometers. For example, the sizes of the apertures can be about 10 nanometers, 50 nanometers, 100 nanometers, 500 nanometers, 1 micrometer, 5 micrometers, 10 micrometers, or 50 micrometers. When the size of the apertures is less than 100 micrometers, the carbon nanotube array 110 grown in following step can lift the carbon nanotube layer 102 up away from the growing surface 105. When the size of the apertures is too large, the carbon nanotube array 110 grown in following step will get through the apertures and the carbon nanotube layer 102 cannot be lifted up. In one embodiment, the sizes of the apertures are in a range from about 50 nanometers to about 100 nanometers. In order to deposit enough second catalyst 106 on the growing surface 105, to grown the carbon nanotube array 110 in following step, the duty ratio of the carbon nanotube layer 102 can be in a range from about 95:5 to about 5:95. For example, the duty ratio of the carbon nanotube layer 102 can be about 9:1, 8:2, 7:3, 6:4, 5:5, 4:6, 3:7, 2:8 or 1:9. In one embodiment, the duty ratio of the carbon nanotube layer 102 is in a range from about 1:4 to about 4:1. The duty ratio of the carbon nanotube layer 102 is an area ratio between the sheltered growing surface 105 and the exposed growing surface 105.

The carbon nanotubes of the carbon nanotube layer 102 can be orderly arranged to form an ordered carbon nanotube structure or disorderly arranged to form a disordered carbon nanotube structure. The term 'disordered carbon nanotube structure' includes, but is not limited to, a structure wherein the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other. The term 'ordered carbon nanotube structure' includes, but is not limited to, a structure wherein the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

The carbon nanotube layer 102 can include at least one carbon nanotube film, at least one carbon nanotube wire, or combination thereof. In one embodiment, the carbon nanotube layer 102 can include a single carbon nanotube film or two or more carbon nanotube films stacked together. Thus, the thickness of the carbon nanotube layer 102 can be controlled by the number of the stacked carbon nanotube films. The number of the stacked carbon nanotube films can be in a range from about 2 to about 100. For example, the number of the stacked carbon nanotube films can be 10, 30, or 50. In one embodiment, the carbon nanotube layer 102 can include a layer of parallel and spaced carbon nanotube wires. Also, the carbon nanotube layer 102 can include a plurality of carbon nanotube wires crossed or weaved together to form a carbon nanotube net. It is understood that any carbon nanotube structure described can be used with all embodiments.

Figure 2:
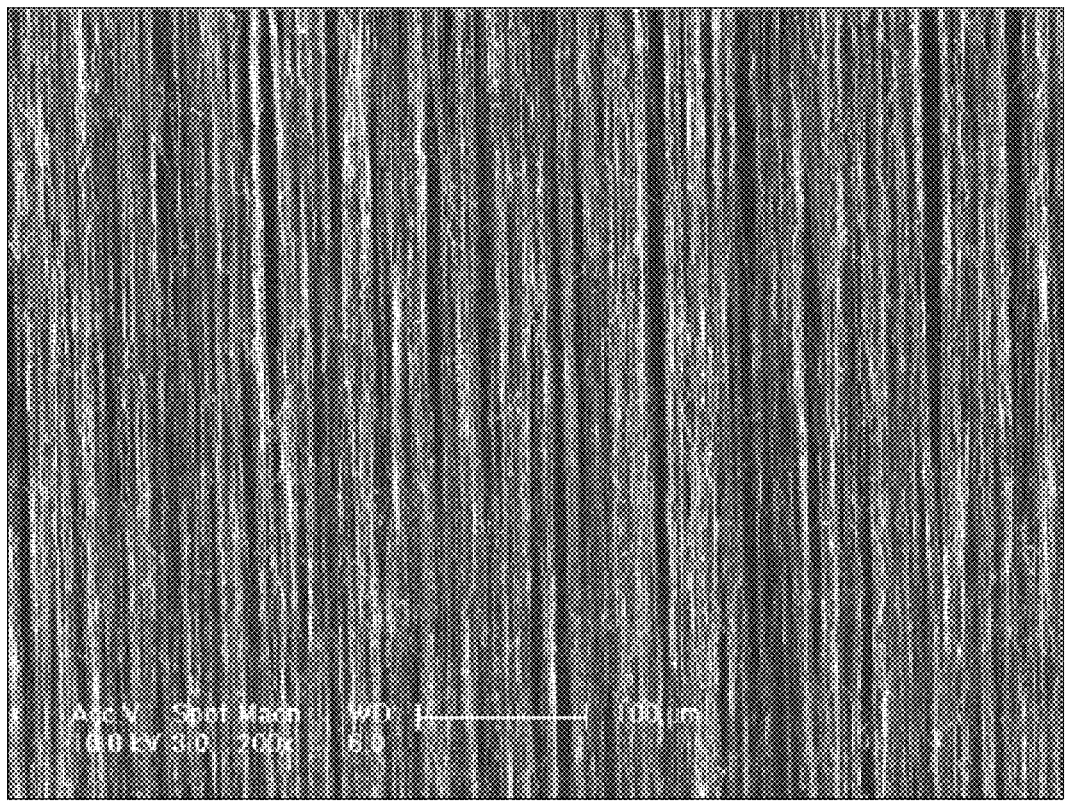
FIG. 2 is a Scanning Electron Microscope (SEM) image of a drawn carbon nanotube film.
Figure 3:
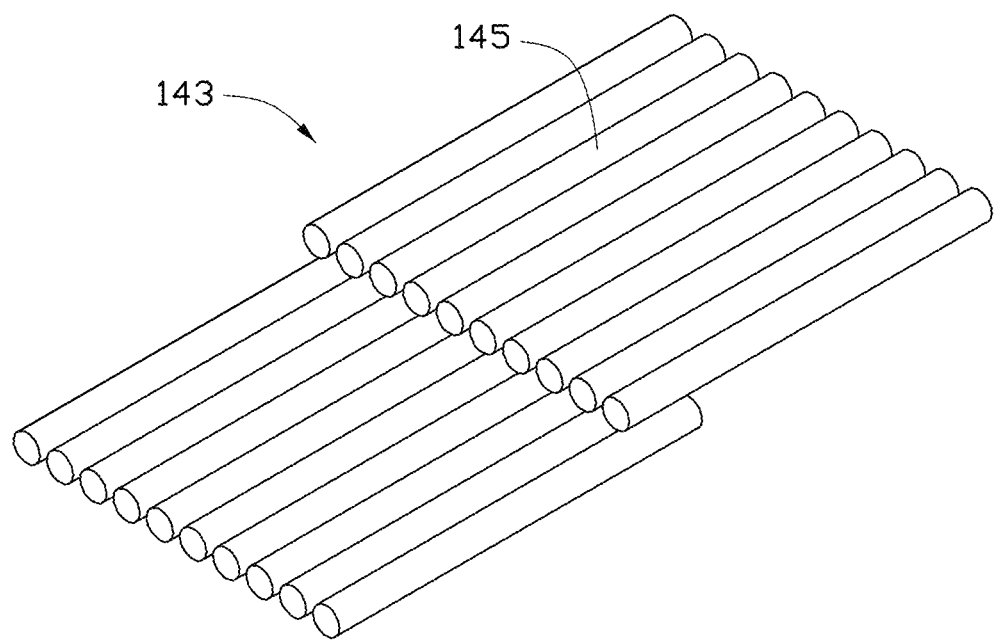
FIG. 3 is a schematic structural view of a carbon nanotube segment of the drawn carbon nanotube film of FIG. 2.

In one embodiment, the carbon nanotube layer 102 includes at least one drawn carbon nanotube film. A drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing film. Referring to FIGS. 2 to 3, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. As can be seen in FIG. 2, some variations can occur in the drawn carbon nanotube film. The carbon nanotubes 145 in the drawn carbon nanotube film are oriented along a preferred orientation. The drawn carbon nanotube film can be treated with an organic solvent to increase the mechanical strength and toughness and reduce the coefficient of friction of the drawn carbon nanotube film. A thickness of the drawn carbon nanotube film can range from about 0.5 nanometers to about 100 micrometers. The drawn carbon nanotube film can be attached to the growing surface 105 directly.

Figure 4:
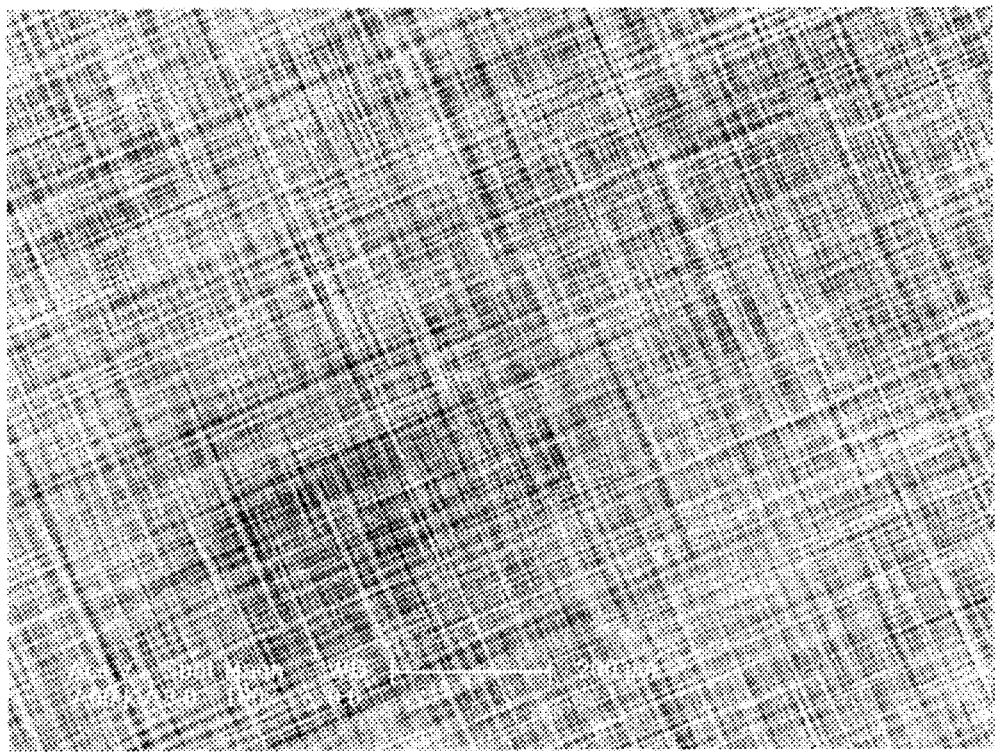
FIG. 4 is an SEM image of cross-stacked drawn carbon nanotube films.

The carbon nanotube layer 102 can include at least two stacked drawn carbon nanotube films. In other embodiments, the carbon nanotube layer 102 can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of micropores is defined by the carbon nanotube layer 102. Referring to FIG. 4, the carbon nanotube layer 102 is shown with the aligned directions of the carbon nanotubes between adjacent stacked drawn carbon nanotube films at 90 degrees. Stacking the carbon nanotube films will also add to the structural integrity of the carbon nanotube layer 102.

Figure 5:
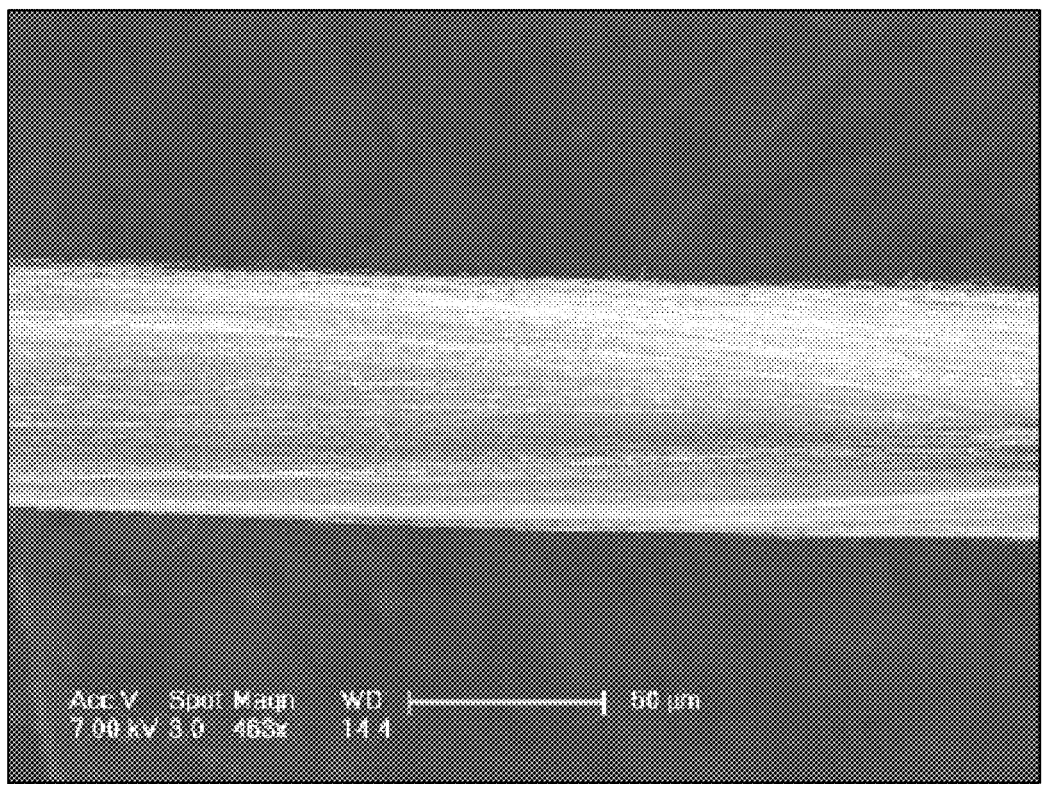
FIG. 5 is an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. Referring to FIG. 5, the untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity, and shape. The length of the untwisted carbon nanotube wire can be arbitrarily set as desired. A diameter of the untwisted carbon nanotube wire ranges from about 0.5 nanometers to about 100 micrometers.

Figure 6:
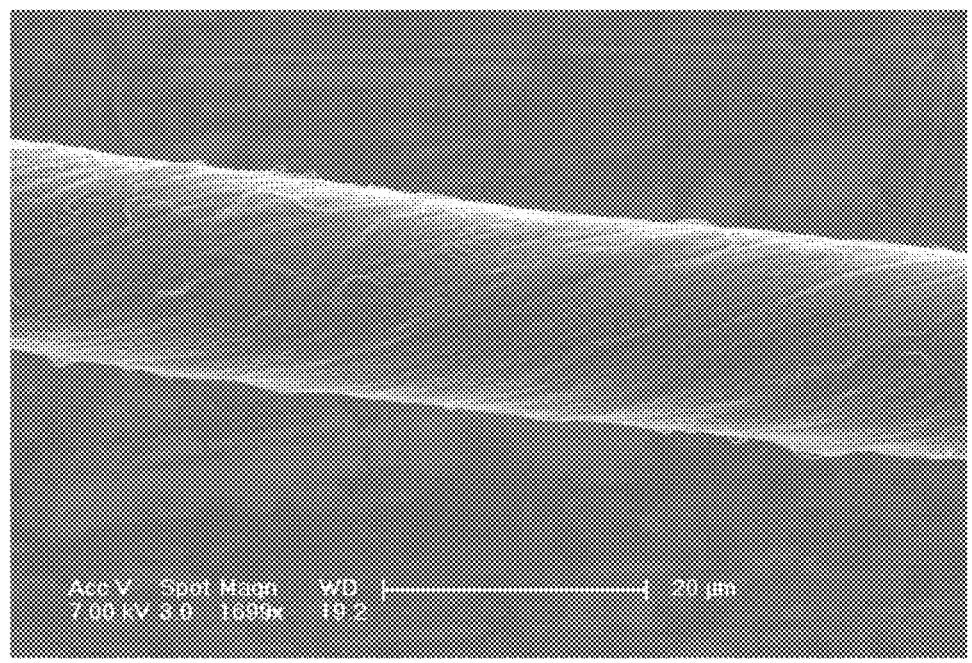
FIG. 6 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 6, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. The length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted to bundle the adjacent paralleled carbon nanotubes together. The specific surface area of the twisted carbon nanotube wire will decrease, while the density and strength of the twisted carbon nanotube wire will increase.

Figure 7:
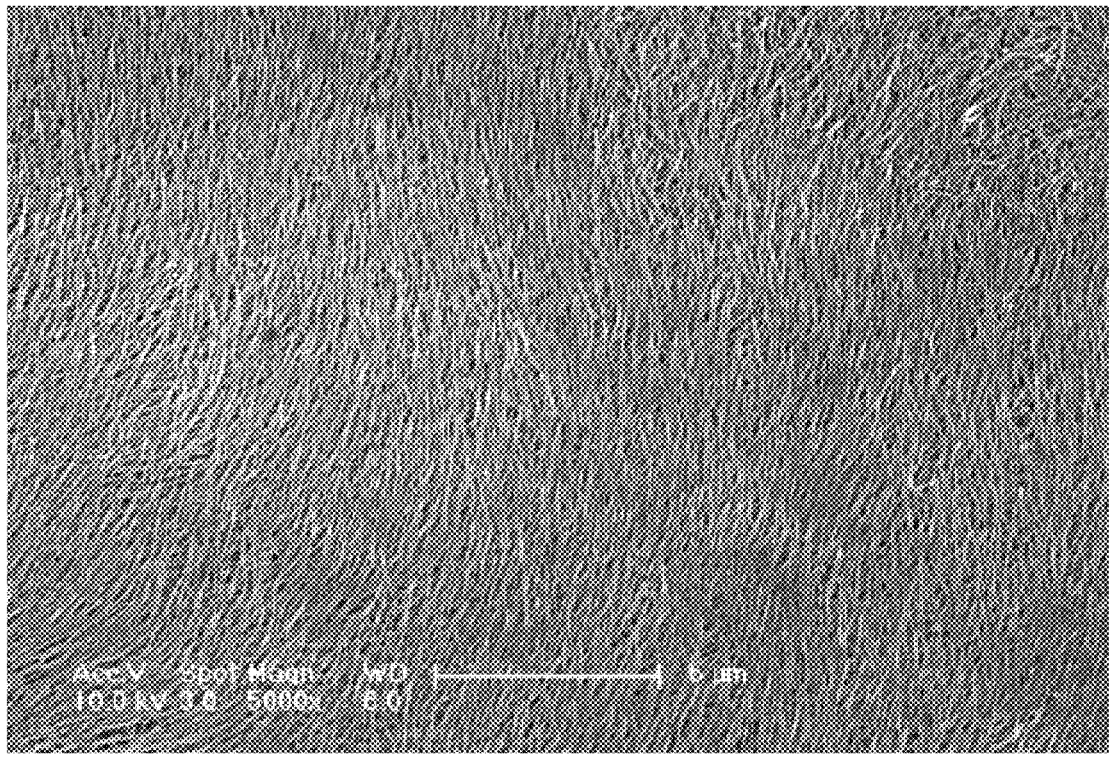
FIG. 7 is an SEM image of a pressed carbon nanotube film.

In another embodiment, the carbon nanotube layer 102 can include a pressed carbon nanotube film. Referring to FIG. 7, the pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle formed. If the carbon nanotubes in the pressed carbon nanotube film are arranged along different directions, the carbon nanotube layer 102 can be isotropic.

Figure 8:
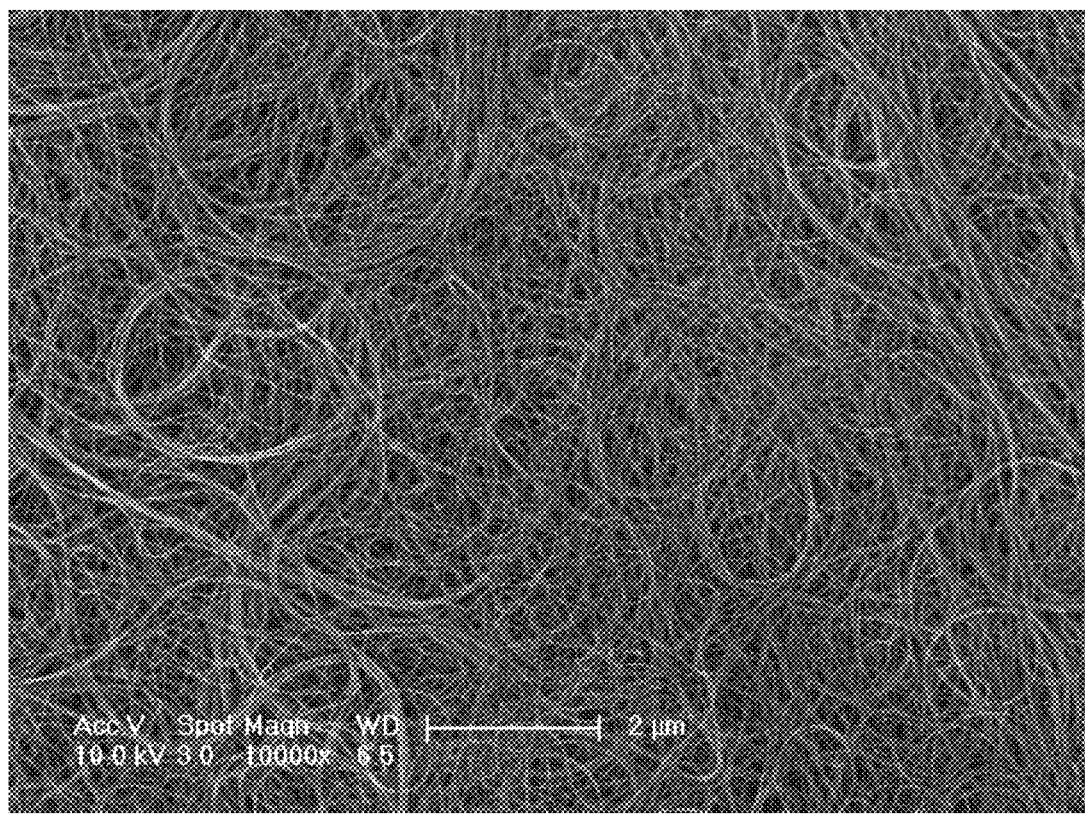
FIG. 8 is an SEM image of a flocculated carbon nanotube film.

In another embodiment, the carbon nanotube layer 102 includes a flocculated carbon nanotube film. Referring to FIG. 8, the flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. Sizes of the micropores can be less than 10 micrometers. The porous nature of the flocculated carbon nanotube film will increase the specific surface area of the carbon nanotube layer 102. Further, due to the carbon nanotubes in the carbon nanotube layer 102 being entangled with each other, the carbon nanotube layer 102 employing the flocculated carbon nanotube film has excellent durability, and can be fashioned into desired shapes with a low risk to the integrity of the carbon nanotube layer 102. The flocculated carbon nanotube film, in some embodiments, is free-standing due to the carbon nanotubes being entangled and adhered together by van der Waals attractive force therebetween.

In step (S13), the catalyst can be deposited by a method of electron beam evaporation, magnetron sputtering, plasma deposition, electro-deposition and thermal deposition.

Because the carbon nanotube layer 102 has a plurality of apertures, part of the catalyst is deposited on the carbon nanotube layer 102, to form the first catalyst 104, and the other part of the catalyst is deposited on growing surface 105 through the apertures to form the second catalyst 106.

The material of the catalyst is a transition metal. Examples of transitional metals are iron (Fe), cobalt (Co), nickel (Ni), platinum (Pt), palladium (Pd), or mixtures or alloys of the metals. The deposition rate of the catalyst can be can be less than 0.5 nm/s. The thickness of the catalyst can be in a range from about 1 nanometer to about 30 nanometers. In one embodiment, the catalyst is layer of iron with a thickness of 5 nanometers to about 10 nanometers. Furthermore, a step of annealing can be performed in vacuum at a temperature in a range from about 700° C. to about 900° C. for a time in a range from about 30 minutes to about 90 minutes, thereby transforming the catalyst layer into catalyst particles.

In another embodiment, the first catalyst 104 and the second catalyst 106 can be a patterned catalyst layer. That is, the first catalyst 104 is only deposited on part of the carbon nanotube layer 102, and the second catalyst 106 is only deposited on part of the growing surface 105. For example, a patterned mask can be used to shelter part of the carbon nanotube layer 102 and the growing surface 105 during the process of depositing catalyst, thereby obtaining a patterned first catalyst 104 and a patterned second catalyst 106. Thus, a patterned carbon nanotube array 110 and a patterned carbon nanotube cluster 108 can be achieved.

In step (S14), the carbon nanotube array 110 and the carbon nanotube cluster 108 are grown by the method of chemical vapor deposition. In one embodiment, the step (14) includes the following substeps:

step (S141), placing the substrate 101 with the carbon nanotube layer 102 thereon into a reacting room;

step (S142), introducing a carbon source gas and a protecting gas into the reacting room; and step (S143), heating the substrate 101 having the carbon nanotube layer 102 thereon to a temperature in a range from about 300° C. to about 1200° C.

In step (S141), the reacting room is a quartz tube in a quartz tube furnace. The reacting room is further evacuated to form a vacuum before step (S142).

In step (S142), the protecting gas is introduced into the reacting room first, and then the carbon source gas is introduced into the reacting room with a carrier gas. The protecting gas comprises nitrogen gas, argon gas or other inert gas. The carbon source gas can be methane, ethane, acetylene and ethylene. The carrier gas is hydrogen gas.

In one embodiment, the protecting gas is argon gas. The carbon source gas is acetylene. The flow of the acetylene gas can be in a range from about 30 sccm to about 200 sccm. The flow of the hydrogen gas can be in a range from about 30 sccm to about 300 sccm. The pressure of the reacting room can be in a range from about 2 Torr sccm to about 760 Torr. The flow rate of the carbon source gas and the carrier gas is in a range from about 0.1% to about 10%. The amorphous carbon deposition speed is determined by the content of the carbon source gas in the reaction gas. The molar ratio of carbon source gas and carrier gas lower, the slower the deposition speed of the amorphous carbon. In one embodiment, the flow rate of the carbon source gas and the carrier gas is in less than 5%. Thus, the deposition speed of the amorphous carbon can be slow down so as to obtain the carbon nanotubes having a clean surface, and stronger van der Waals force therebetween.

In step (S143), in one embodiment, the heating temperature is in a range from about 500° C. to about 740° C. The carbon source gas is introduced for a time in a range from about 5 minutes to about 60 minutes to grow the carbon nanotube array 110 and the carbon nanotube cluster 108 simultaneously. The carbon nanotube array 110 is grown on the second catalyst 106 and the carbon nanotube cluster 108 is grown on the first catalyst 104. The growth mechanism of the carbon nanotubes of the carbon nanotube array 110 and the carbon nanotube cluster 108 can be top growth mechanism or bottom growth mechanism.

The carbon nanotubes of the carbon nanotube array 110 are grown along a direction vertical to the growing surface 105 of the substrate 101. The carbon nanotube array 110 lifts the carbon nanotube layer 102 up away from the growing surface 105. Thus, the carbon nanotube layer 102 is formed on a surface of the carbon nanotube array 110. The carbon nanotubes of the carbon nanotube array 110 are almost parallel with each other. The height of the carbon nanotubes of the carbon nanotube array 110 can be in a range from about 10 micrometers to about 900 micrometers. The ends of the carbon nanotubes of the carbon nanotube array 110 adjacent to the growing surface 105 are substantially form a flat surface. The portions of the carbon nanotubes of the carbon nanotube array 110 that are away from the growing surface 105 are entangled with each other.

The carbon nanotubes of the carbon nanotube cluster 108 are grown disorderly and intricately. The length of the carbon nanotubes of the carbon nanotube cluster 108 can be in a range from about 10 micrometers to about 900 micrometers. The carbon nanotubes of the carbon nanotube cluster 108, the carbon nanotubes of the carbon nanotube layer 102, and the portions of the carbon nanotubes of the carbon nanotube array 110, that are adjacent to the carbon nanotube layer 102, are entangled with each other so that the carbon nanotube array 110, the carbon nanotube cluster 108, and the carbon nanotube layer 102 form a free standing integrated structure. Thus, the carbon nanotube array 110 is firmly fixed on the carbon nanotube layer 102.

Furthermore, an optional step (S15) of removing the carbon nanotube structure 100 from the substrate 101 can be performed after step (S14). The carbon nanotube array 110, the carbon nanotube cluster 108 and the carbon nanotube layer 102 can be removed from the substrate 101 together because they form a free standing integrated structure. In one embodiment, the carbon nanotube structure can be peeled off from the substrate 101 via the carbon nanotube layer 102 easily.

Figure 9:
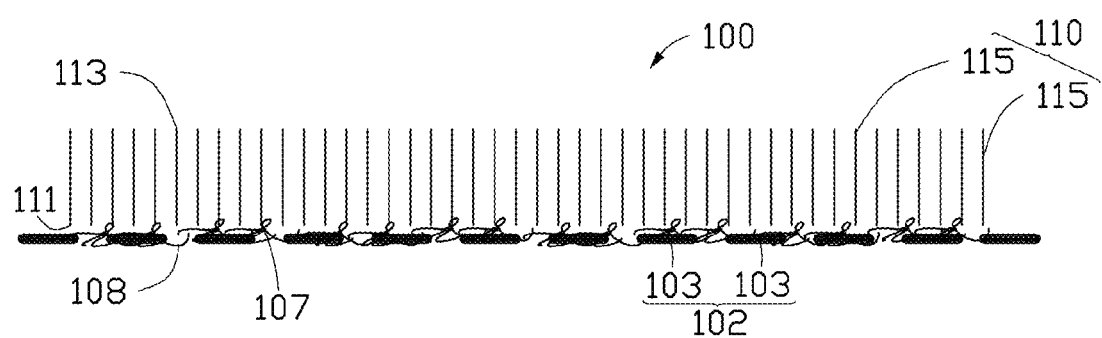
FIG. 9 is a schematic view of one embodiment of a carbon nanotube structure fabricated in the method of FIG. 1.

Referring to FIG. 9, the carbon nanotube structure 100 of one embodiment fabricated by the method of FIG. 1 includes the carbon nanotube array 110, the carbon nanotube cluster 108, and the carbon nanotube layer 102.

The carbon nanotube array 110 has a first surface 111 and a second surface 113 opposite to the first surface 111. The carbon nanotube array 110 includes a plurality of first carbon nanotubes 115 that are substantially in parallel with each other. The plurality of first carbon nanotubes 115 extend from the first surface 111 to the second surface 113. The carbon nanotube layer 102 is located on the first surface 11 of the carbon nanotube array 110. The carbon nanotube layer 102 includes a plurality of second carbon nanotubes 103. The plurality of second carbon nanotubes 103 are joined by van der Waals attractive force therebetween to form a free-standing structure. The carbon nanotube cluster 108 is located on surface of the carbon nanotube layer 102. The carbon nanotube cluster 108 includes a plurality of third carbon nanotubes 107. The third carbon nanotubes 107 and the portions of the first carbon nanotubes 115 that are adjacent to the carbon nanotube layer 102 are entangled with each other and extend around the second carbon nanotubes 103. Thus, the carbon nanotube array 110, the carbon nanotube cluster 108, and the carbon nanotube layer 102 form a free standing integrated structure. In one embodiment, the third carbon nanotubes 107 are entangled around the first carbon nanotubes 115 and the second carbon nanotubes 103 simultaneously. Each of the third carbon nanotubes 107 has a first part entangled around the first carbon nanotubes 115 and a second part entangled around the second carbon nanotubes 103.

In one embodiment, the carbon nanotube layer 102 includes two stacked drawn carbon nanotube films as shown in FIG. 4. The aligned directions of the carbon nanotubes of the two stacked drawn carbon nanotube films are substantially perpendicular with each other.

Figure 10:
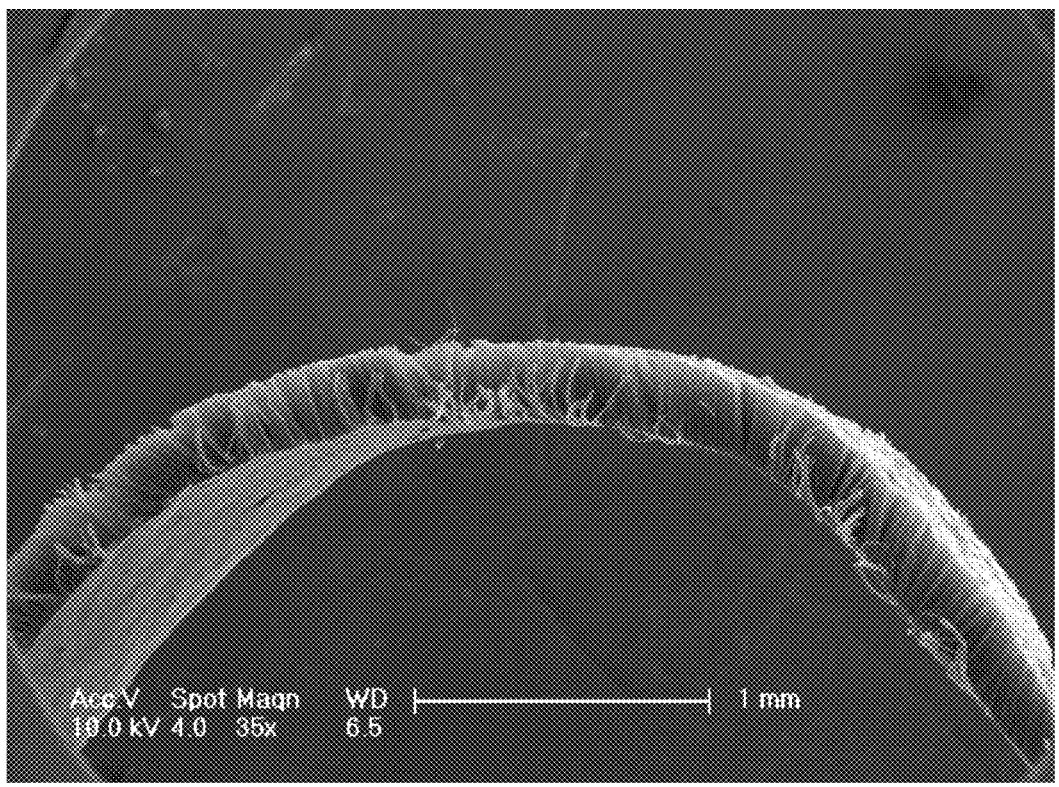
FIG. 10 is an SEM image of one embodiment of a carbon nanotube structure fabricated in the method of FIG. 1.
Figure 11:
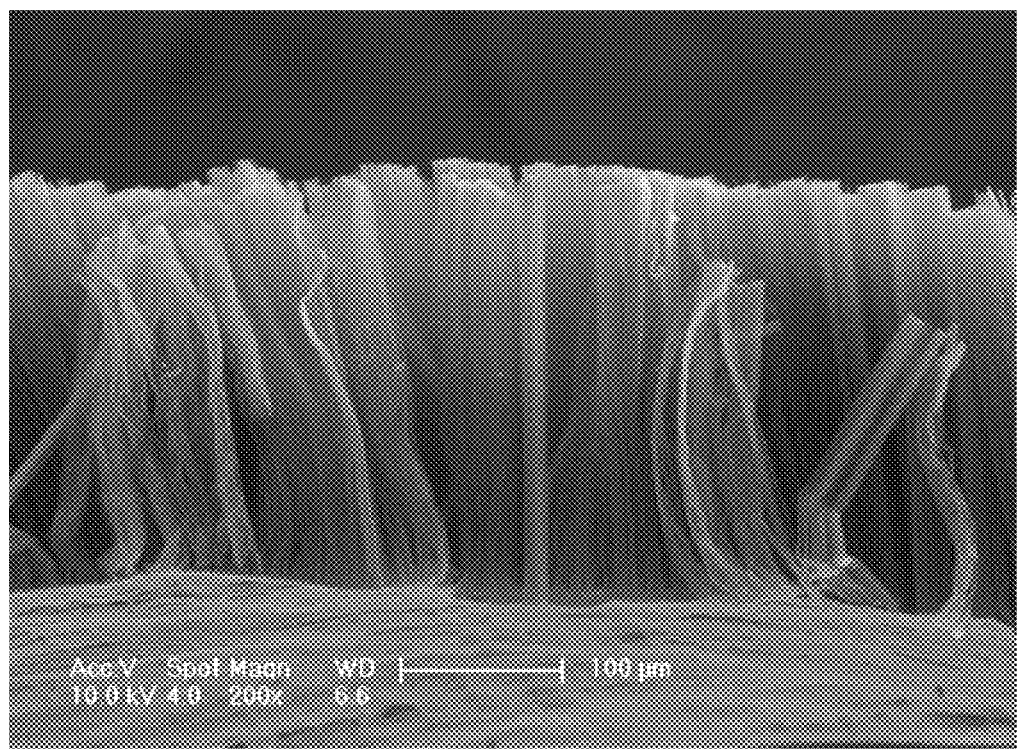
FIG. 11 is an SEM image of side view of one embodiment of the carbon nanotube structure of FIG. 10.
Figure 12:
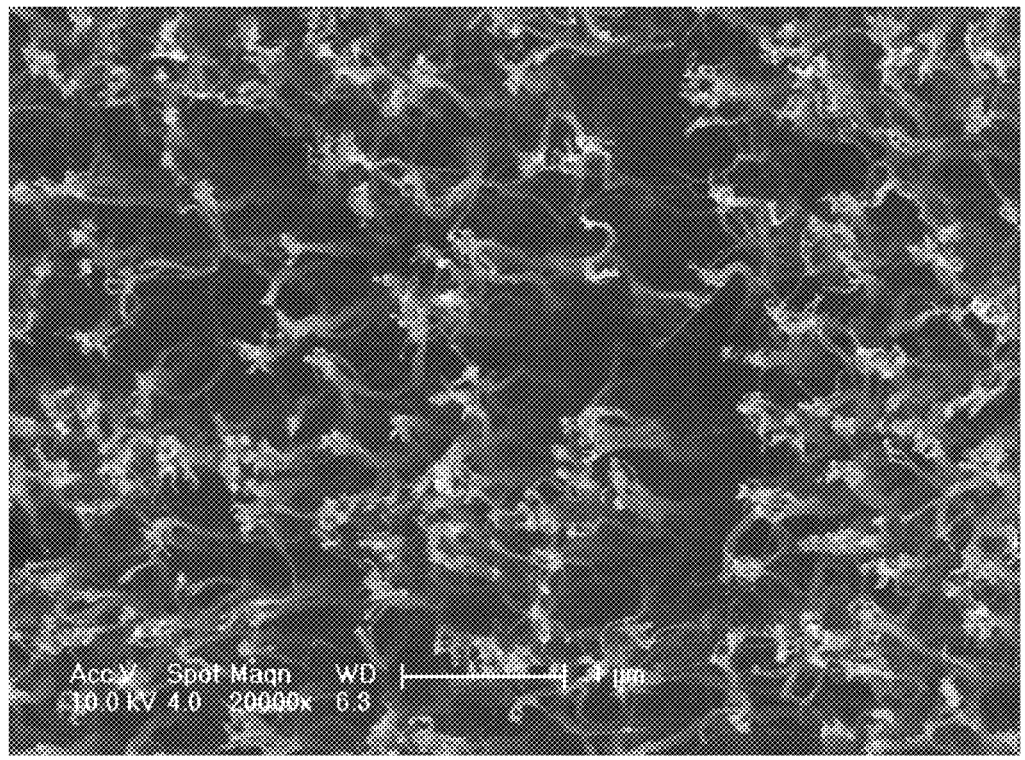
FIG. 12 is an SEM image of top view of one embodiment of the carbon nanotube structure of FIG. 10.
Figure 13:
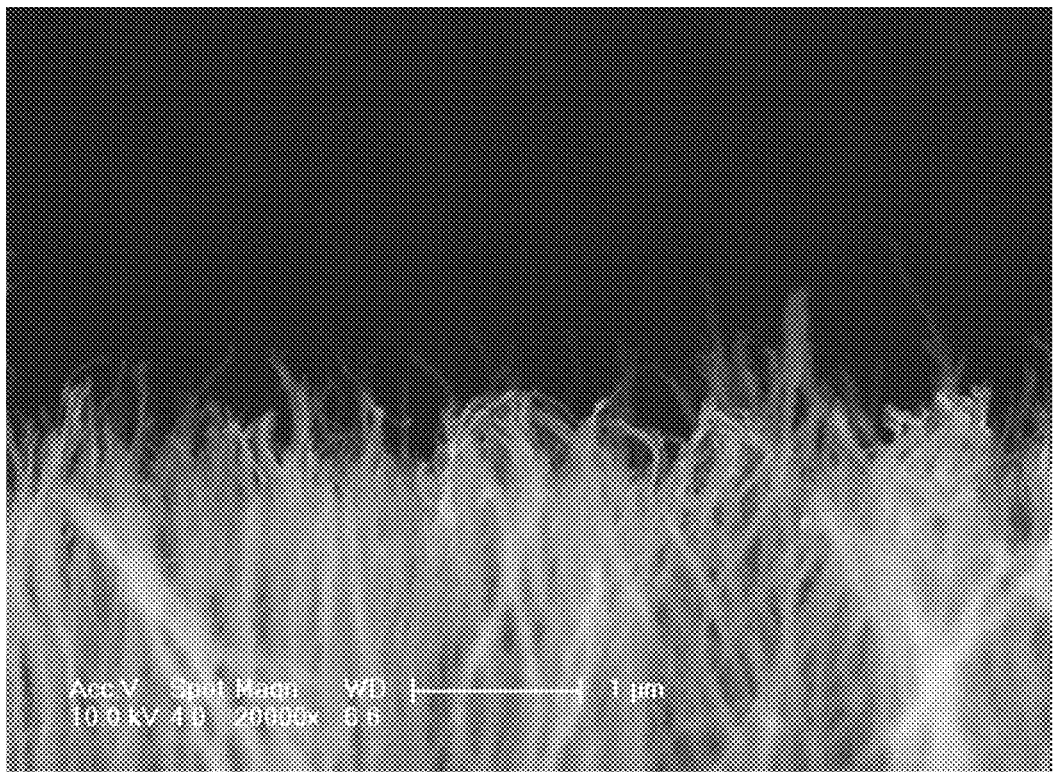
FIG. 13 is an SEM image of top side view of one embodiment of the carbon nanotube structure of FIG. 10.
Figure 14:
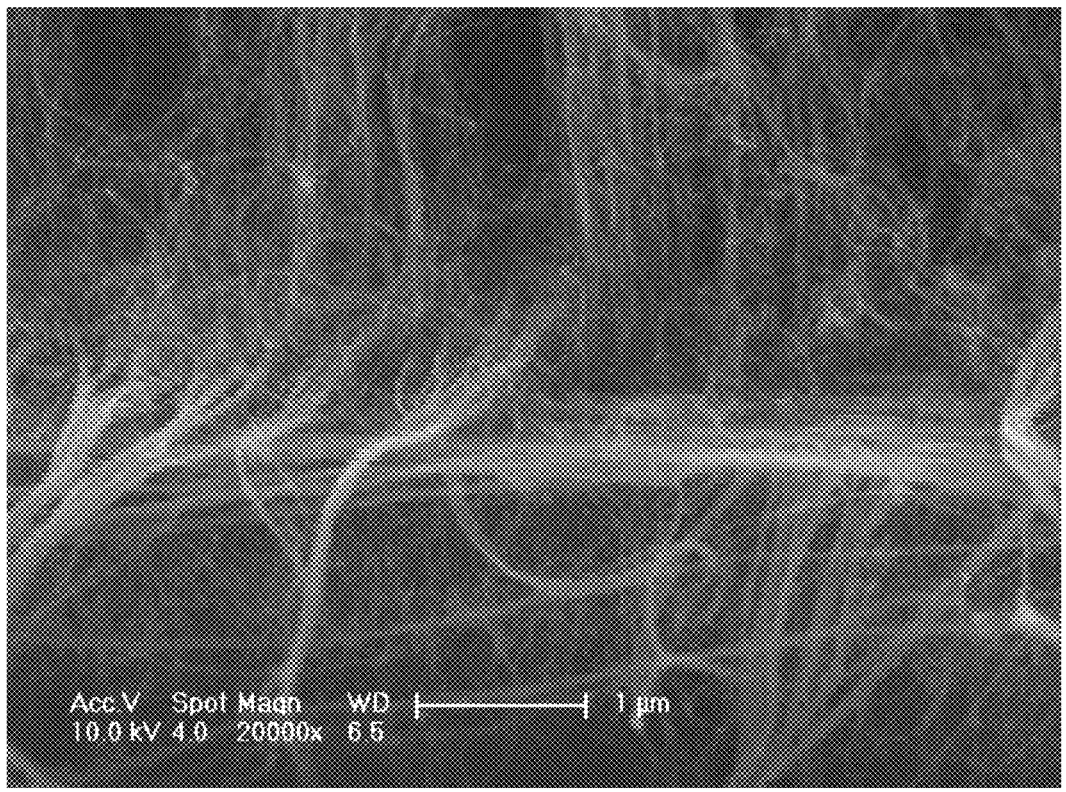
FIG. 14 is an SEM image of bottom side view of one embodiment of the carbon nanotube structure of FIG. 10.
Figure 15:
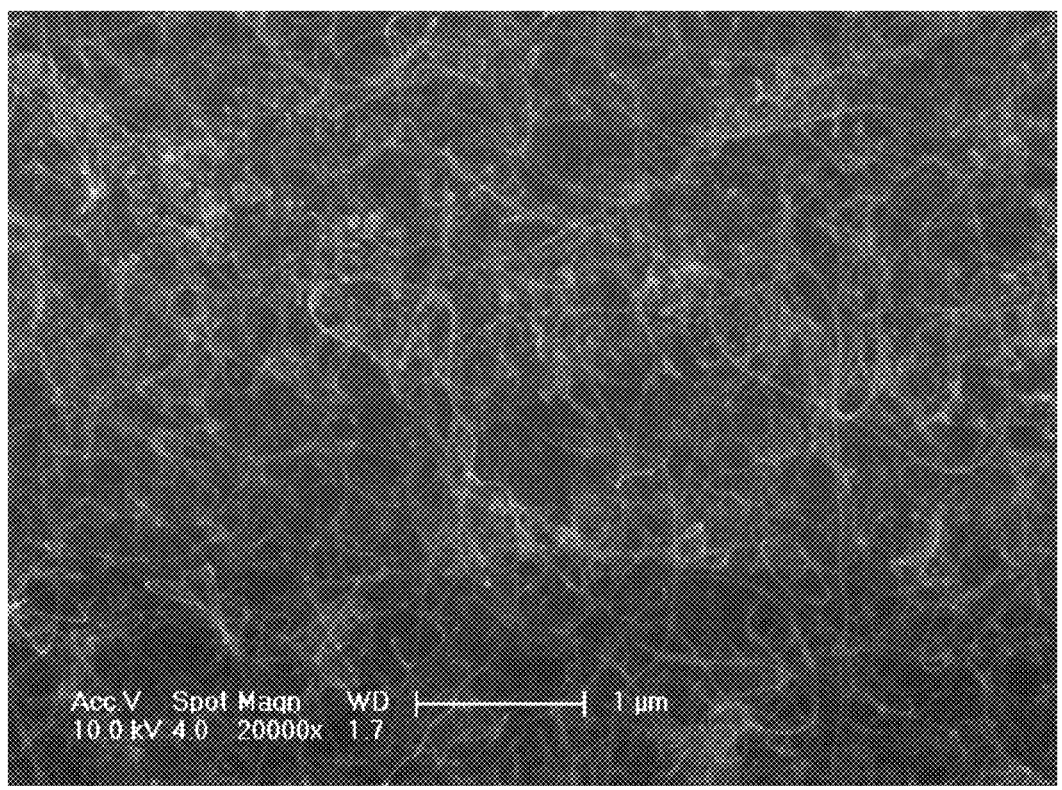
FIG. 15 is an SEM image of bottom view of one embodiment of the carbon nanotube structure of FIG. 10.

In one embodiment, the carbon nanotube structure 100 is observed by scanning electron microscope. Here, the side of the carbon nanotube structure 100 adjacent to the carbon nanotube layer 102 is defined as bottom, and the side of the carbon nanotube structure 100 away from the carbon nanotube layer 102 is defined as top. The SEM images of the carbon nanotube structure 100 are shown in FIGS. 10-15. FIG. 10 is an SEM image of the carbon nanotube structure 100 in bend. FIG. 11 is an SEM image of side view of the carbon nanotube structure 100 of FIG. 10. FIG. 12 is an SEM image of top view of the carbon nanotube structure 100 of FIG. 10. FIG. 13 is an SEM image of top side view of the carbon nanotube structure 100 of FIG. 10. FIG. 14 is an SEM image of bottom side view of the carbon nanotube structure 100 of FIG. 10. FIG. 15 is an SEM image of bottom view of the carbon nanotube structure 100 of FIG. 10.

FIG. 10 shows that the carbon nanotube structure 100 is a free standing integrated structure. The carbon nanotube structure 100 is flexible and can be curved into arc shape. FIG. 11 shows that the carbon nanotube array 110 is located on the carbon nanotube layer 102, and ends of the first carbon nanotubes 115 of the carbon nanotube array 110 are in contact with the carbon nanotube layer 102. FIG. 12 shows top ends of the first carbon nanotubes 115 of the carbon nanotube array 110. FIG. 13 shows that the first carbon nanotubes 115 of the carbon nanotube array 110 are substantially in parallel with each other. FIG. 13 shows that the extending direction of the first carbon nanotubes 115 is substantially perpendicular with the extending direction of the second carbon nanotubes 103 of the carbon nanotube layer 102. FIG. 15 shows that the third carbon nanotubes 107 of the carbon nanotube cluster 108 are disordered and entangled with each other.

Figure 16:
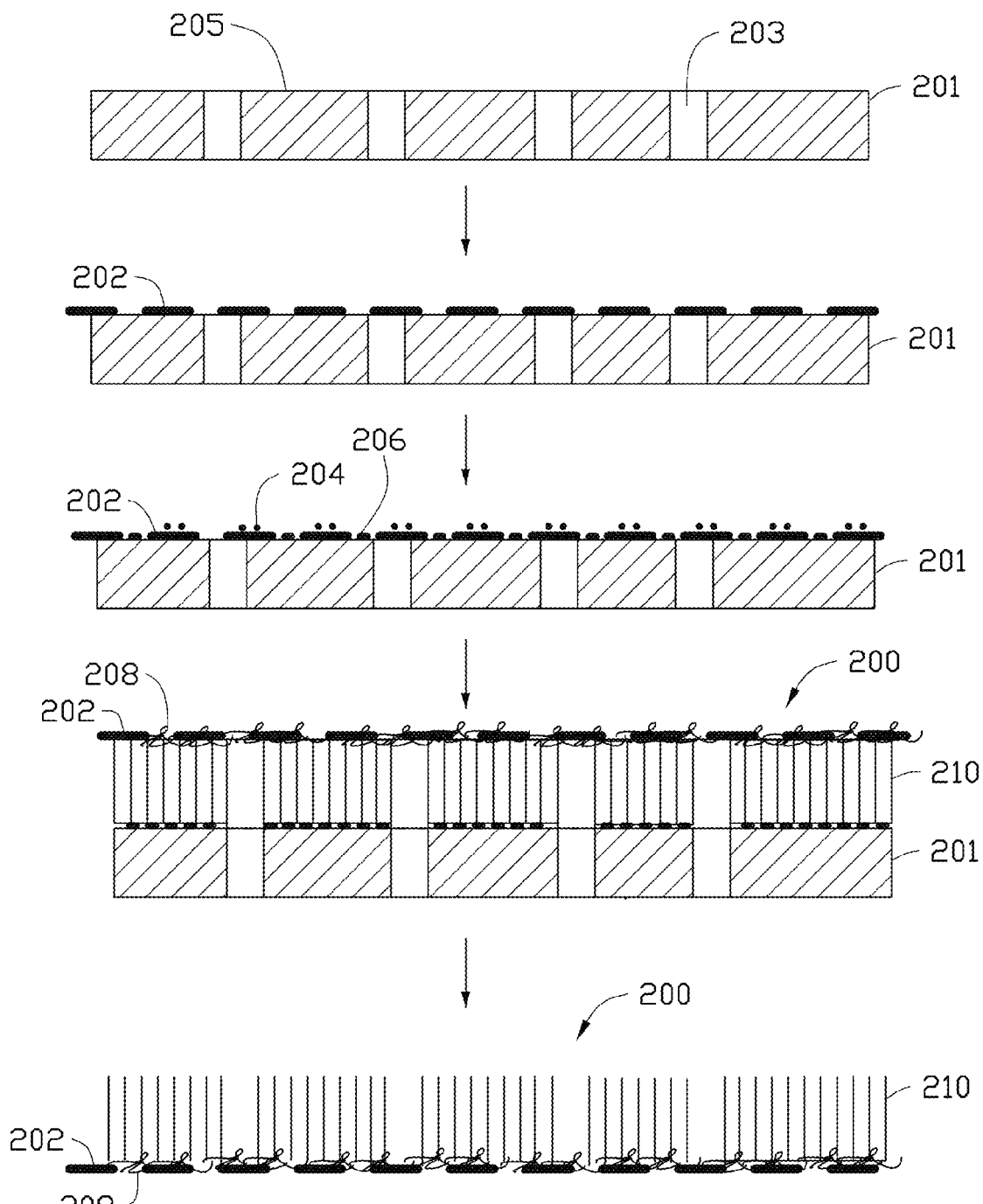
FIG. 16 is a flowchart of one embodiment of a method for making a carbon nanotube structure.

Referring to FIG. 16, a method for making a carbon nanotube structure 200 of one embodiment includes the following steps:

step (S21), providing a substrate 201 having an growing surface 205 and defining a plurality of holes 203;

step (S22), placing a carbon nanotube layer 202 on the growing surface 205 of the substrate 201, wherein part of the growing surface 205 is exposed from the carbon nanotube layer 202;

step (S23), depositing catalyst so that a plurality of first catalyst 204 is deposited on surface of the carbon nanotube layer 202 and a plurality of second catalyst 206 is deposited on the growing surface 205;

step (S24), growing a carbon nanotube array 210 on the growing surface 205 and growing a carbon nanotube cluster 208 on surface of the carbon nanotube layer 202; and step (S25), removing the carbon nanotube structure 200 from the substrate 201.

The method for making the carbon nanotube structure 200 is similar to the method for making the carbon nanotube structure 100 described above except that the substrate 201 defines a plurality of holes 203 and the carbon nanotube array 210 is a patterned structure. Each of the holes 203 can be a blind hole or through hole. The shape of the holes 203 can be round, rectangle, triangle, or square. The plurality of holes 203 can be arranged in an array. The step (S25) is optional.

When the holes 203 are through holes, the position of the substrate 201 corresponding to the through holes 203 cannot have any catalyst. Thus, the carbon nanotube array 210 cannot grow from the position of the substrate 201 corresponding to the through holes 203. That is, the carbon nanotube array 210 only grow from the position of the growing surface 205 where has no hole to achieve a patterned carbon nanotube array 210. When the holes 203 are blind holes, part of the second catalyst 206 will be deposited on the bottom surface of the blind holes 203. Thus, the carbon nanotube array grown on the bottom surface of the blind holes 203 is lower than the carbon nanotube array 210 grown on the growing surface 205 and will not be in contact with and fixed on the carbon nanotube layer 202. In step (S25) of removing the carbon nanotube structure 200 from the substrate 201, the carbon nanotube array grown on the bottom surface of the blind holes 203 will remain on the substrate 201. That is, the patterned carbon nanotube array 210 can be obtained. The carbon nanotubes of the patterned carbon nanotube array 210 can have different height.

Figure 17:
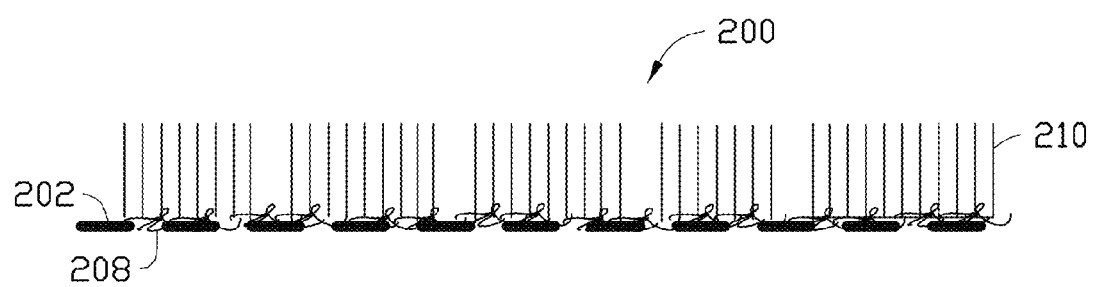
FIG. 17 is a schematic view of one embodiment of a carbon nanotube structure fabricated in the method of FIG. 16.

Referring to FIG. 17, the carbon nanotube structure 200 of one embodiment fabricated by the method of FIG. 16 includes the carbon nanotube array 210, the carbon nanotube cluster 208, and the carbon nanotube layer 202.

The carbon nanotube structure 200 is similar to the carbon nanotube structure 100 described above except that the carbon nanotube array 210 is a patterned structure.

Figure 18:
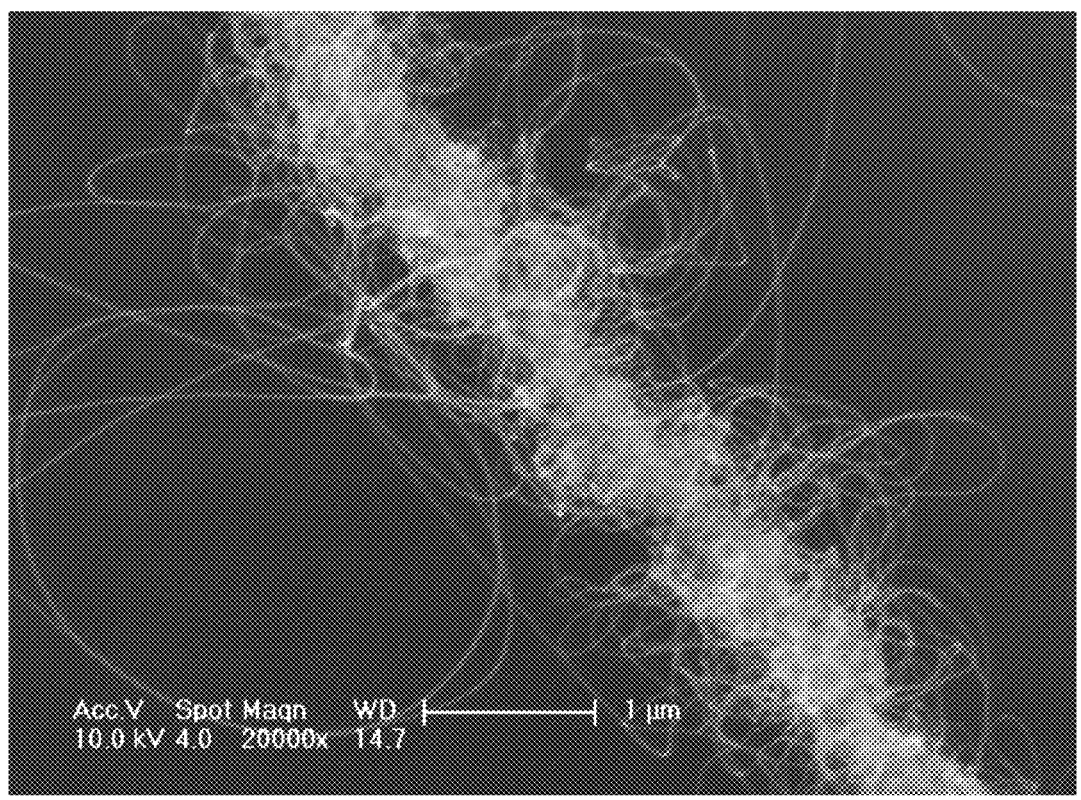
FIG. 18 is an SEM image of one embodiment of a suspended part of a carbon nanotube layer of the carbon nanotube structure fabricated in the method of FIG. 16.

In one embodiment, the carbon nanotube layer 202 includes two stacked drawn carbon nanotube films. The suspended part of the carbon nanotube layer 202 through the holes 203 is observed by scanning electron microscope. As shown in FIG. 18, a plurality of disordered and entangled carbon nanotubes are grown on a carbon nanotube string of the drawn carbon nanotube film to form the carbon nanotube cluster 208, and no carbon nanotube array 210 is grown corresponding to the through holes 203.

Figure 19:
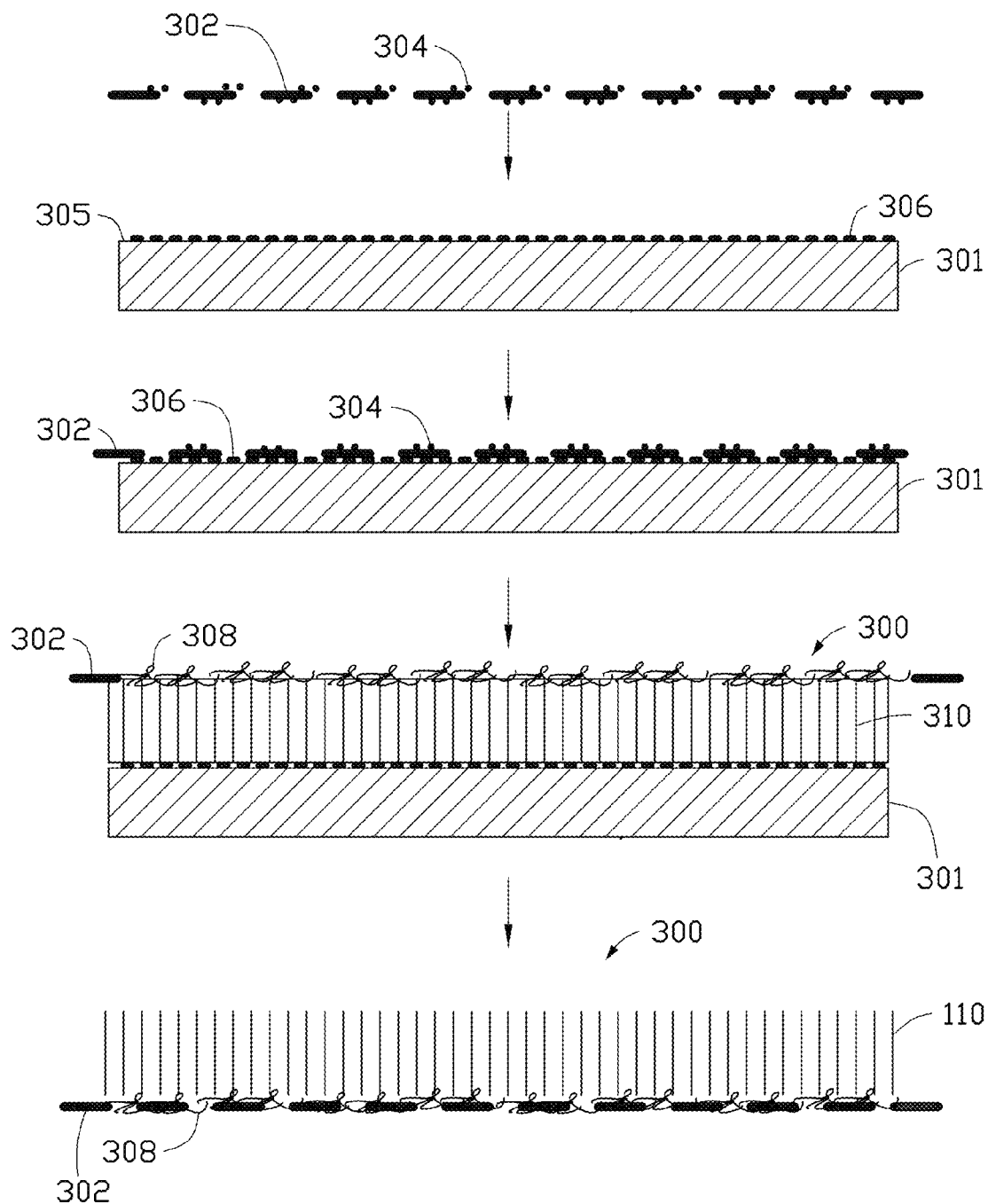
FIG. 19 is a flowchart of one embodiment of a method for making a carbon nanotube structure.

Referring to FIG. 19, a method for making a carbon nanotube structure 300 of one embodiment includes the following steps:

step (S31), providing a carbon nanotube layer 302 including a plurality of carbon nanotubes, and depositing a plurality of first catalyst 304 on the carbon nanotube layer 302;

step (S32), providing a substrate 301 having an growing surface 305 and depositing a plurality of second catalyst 306 on the growing surface 305;

step (S33), placing the carbon nanotube layer 302 on the growing surface 305;

step (S34), growing a carbon nanotube array 310 on the growing surface 305 and growing a carbon nanotube cluster 308 on surface of the carbon nanotube layer 302; and step (S35), removing the carbon nanotube structure 300 from the substrate 301.

The method for making the carbon nanotube structure 300 is similar to the method for making the carbon nanotube structure 100 described above except that the step of depositing a plurality of first catalyst 304 on the carbon nanotube layer 302 and the step of depositing a plurality of second catalyst 306 on the growing surface 305 are performed separately. The step (S35) is optional.

The thickness of the carbon nanotube layer 302 can be above 500 micrometers because the first catalyst 304 and the second catalyst 306 are deposited separately. When the thickness of the carbon nanotube layer 302 is above 500 micrometers, the first catalyst 304 is deposited on the surface of the carbon nanotube layer 302 adjacent to the growing surface 305. In one embodiment, the thickness of the carbon nanotube layer 302 is in a range from about 10 micrometers to about 100 micrometers. Furthermore, the second catalyst 306 can be annealed in air at a temperature in a range from about 700° C. to about 900° C. for a time in a range from about 30 minutes to about 90 minutes, thereby transforming the catalyst layer into catalyst particles.

In one embodiment, the step of depositing a plurality of first catalyst 304 on the carbon nanotube layer 302 can be omitted. The carbon nanotube layer 302 without catalyst can be placed on the growing surface 305 directly. Thus, no carbon nanotube cluster is grown on the carbon nanotube layer 302. The ends of the carbon nanotubes of the carbon nanotube array 310 away from the growing surface 305 are entangled around the carbon nanotubes of the carbon nanotube layer 302.

Figure 20:
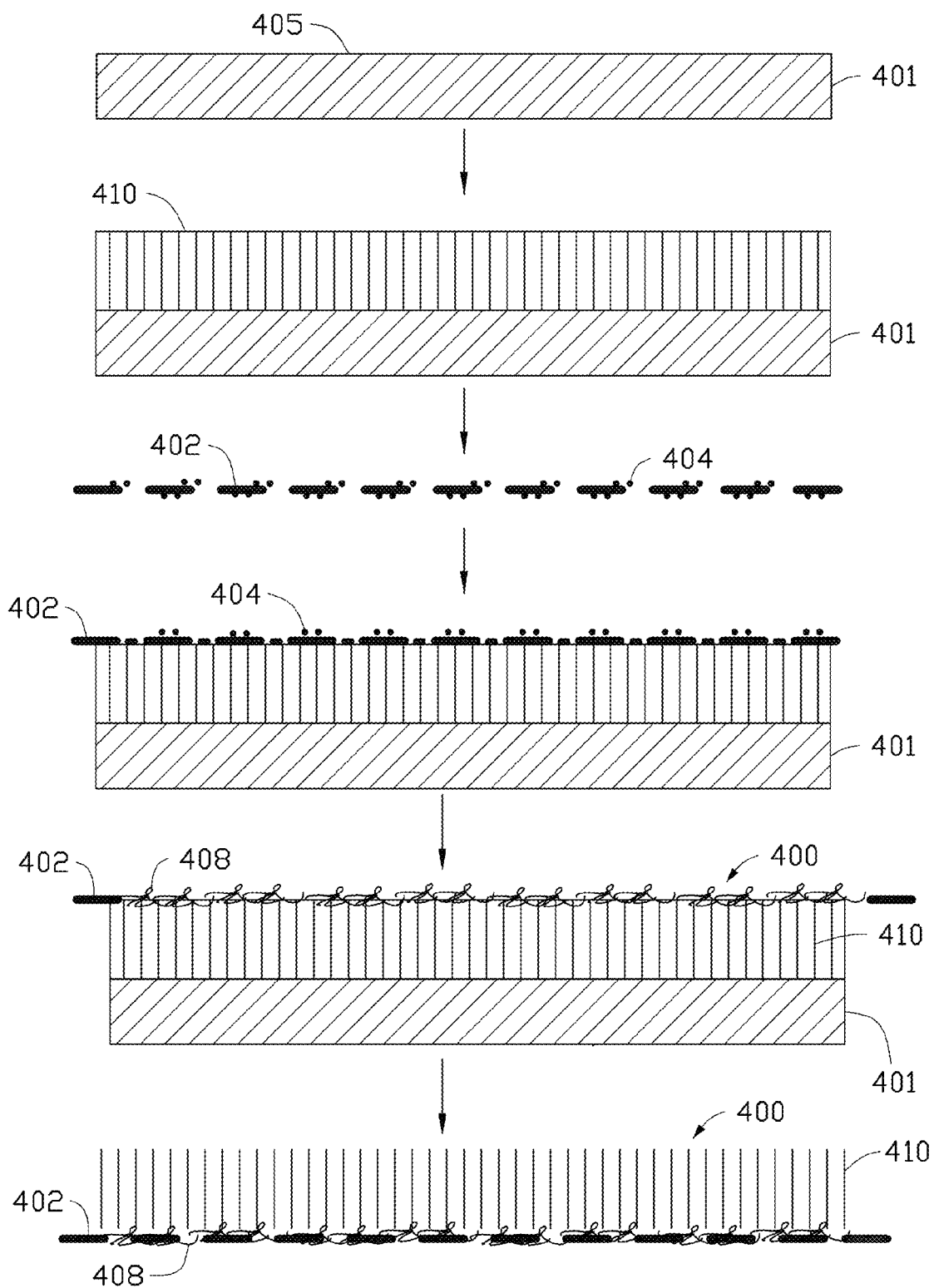
FIG. 20 is a flowchart of one embodiment of a method for making a carbon nanotube structure.

Referring to FIG. 20, a method for making a carbon nanotube structure 400 of one embodiment includes the following steps:

step (S41), providing a substrate 401 having an growing surface 405;

step (S42), growing a carbon nanotube array 410 on the growing surface 405;

step (S43), providing a carbon nanotube layer 402 including a plurality of carbon nanotubes, and depositing a plurality of first catalyst 404 on the carbon nanotube layer 302;

step (S44), placing the carbon nanotube layer 402 on a surface of the carbon nanotube array 410 away from the growing surface 405;

step (S45), and growing a carbon nanotube cluster 408 on surface of the carbon nanotube layer 402; and step (S46), removing the carbon nanotube structure 400 from the substrate 401.

The method for making the carbon nanotube structure 400 is similar to the method for making the carbon nanotube structure 100 described above except that the step of growing the carbon nanotube array 410 and the step of growing the carbon nanotube cluster 408 are performed separately. The step (S46) is optional.

The result of the method enables easy peeling the carbon nanotube array 410 from the substrate 401. The carbon nanotube cluster 408 can fix the carbon nanotube array 410 on the carbon nanotube layer 402 firmly and enhance the electrical contact between the carbon nanotube array 410 and the carbon nanotube layer 402. The carbon nanotube array 410 can withstand larger electric field force and is suitable for field emission device.

Figure 21:
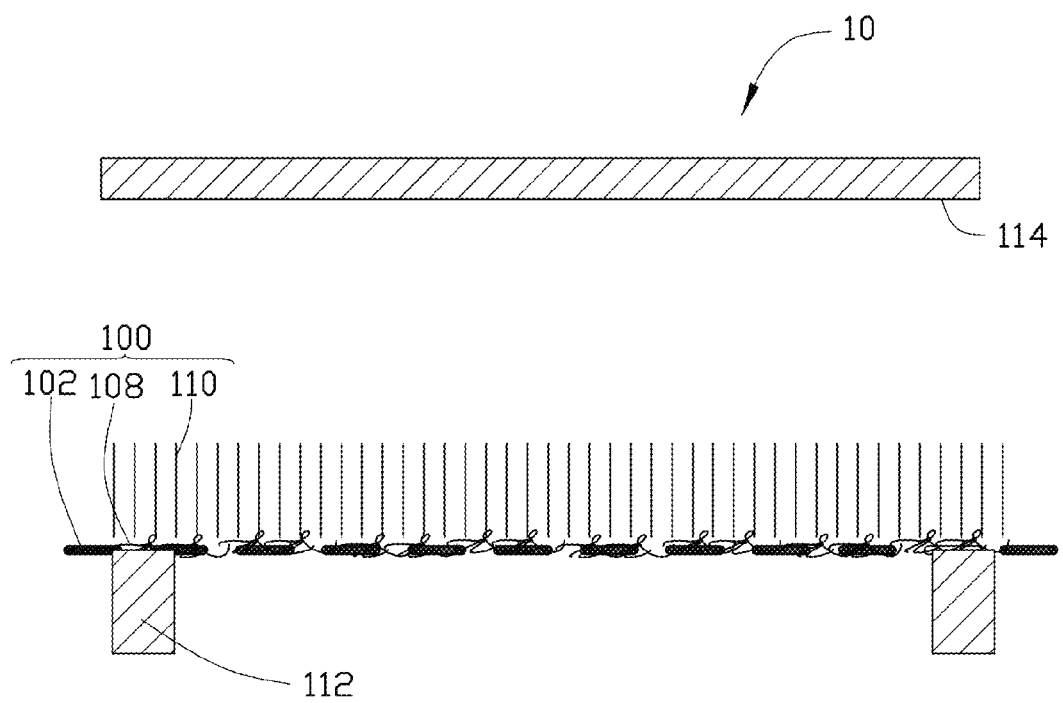
FIG. 21 is a schematic view of one embodiment of a field emission device using the carbon nanotube structure of FIG. 9.

Referring to FIG. 21, a field emission device 10 using the carbon nanotube structure 100 of one embodiment includes the carbon nanotube structure 100, two electrodes 112 electrically connected with the carbon nanotube structure 100, and an anode electrode 114 spaced from the carbon nanotube structure 100. The carbon nanotube structure 100 includes the carbon nanotube array 110, the carbon nanotube cluster 108, and the carbon nanotube layer 102. The carbon nanotube structure 100 can be replaced by the carbon nanotube structure 200, the carbon nanotube structure 300, or the carbon nanotube structure 400.

Figure 22:
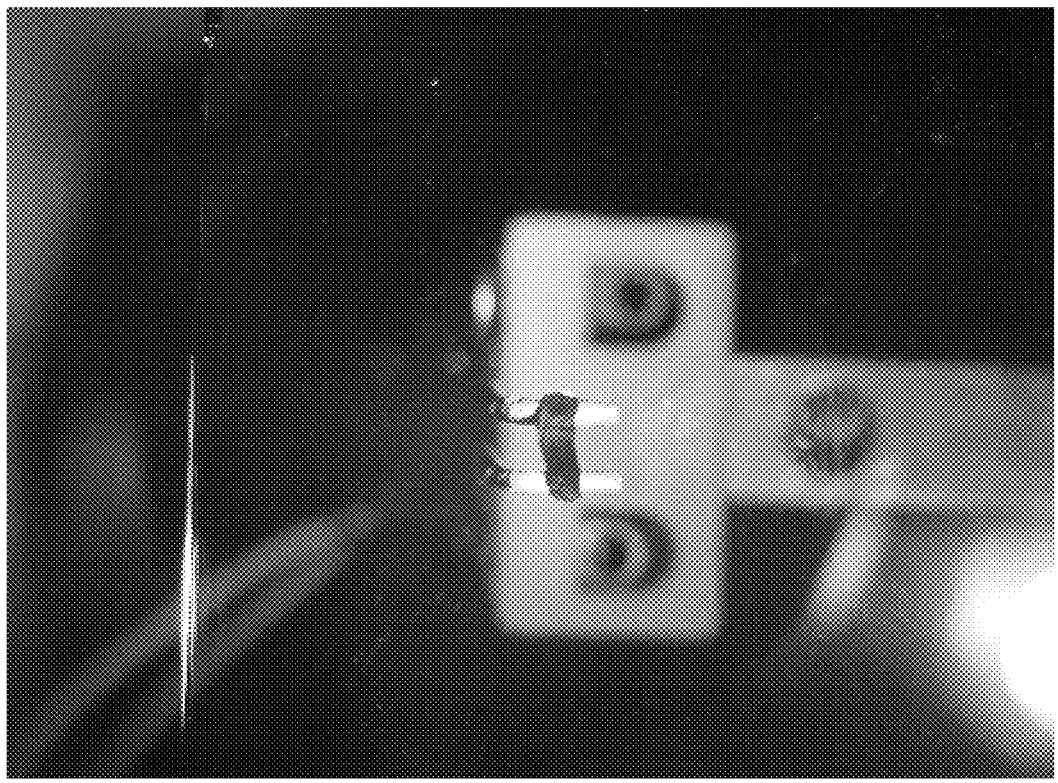
FIG. 22 is a photo of one embodiment of a field emission device using the carbon nanotube structure of FIG. 9.

The two electrodes 112 are spaced from each other. The carbon nanotube layer 102 is located on and in contact with surfaces of the two electrodes 112. Part of the carbon nanotube layer 102 between the two electrodes 112 is suspended. The carbon nanotubes of the carbon nanotube array 110 extend along a direction that is perpendicular to the anode electrode 114. Furthermore, an optional gate electrode (not shown) can be located between the carbon nanotube structure 100 and the anode electrode 114, so as to control the emission. The shapes of the two electrodes 112 are not limited, and the two electrodes 112 can be made of a conductive material, such as metal. The anode electrode 114 is a conductive layer, such as a metal layer, an indium tin oxide (ITO) layer, or a carbon nanotube layer. The thickness of the anode electrode 114 can be selected according to need. In one embodiment, the two electrodes 112 are two parallel nickel rods, the carbon nanotube structure 100 is suspended between the two nickel rods as shown in FIG. 22.

In use, the field emission device 10 is located in a chamber (not shown) in vacuum with a pressure lower that $10^{-5}$ Pa or filled with inert gas. In one embodiment, the carbon nanotube structure 100 is grounded, and a positive voltage is applied to the anode electrode 114. Thus, a potential difference is obtained between the carbon nanotube structure 100 and the anode electrode 114. The carbon nanotubes of the carbon nanotube array 110 will emit electrons under the electric field force. Because the carbon nanotube cluster 108 fix the carbon nanotube array 110 on the carbon nanotube layer 102 firmly, the carbon nanotubes of the carbon nanotube array 110 can withstand larger electric field force and will not be pulled out. Furthermore, a voltage is applied between the two electrodes 112 so that a current flow through the carbon nanotube structure 100 will heat the carbon nanotubes of the carbon nanotube array 110 during the process of field electron emission. Thus, the gas absorbed in the carbon nanotube array 110 will be removed by heating and the carbon nanotube array 110 can emit electrons more stably. Because part of the carbon nanotube structure 100 is suspended between the two electrodes 112 and the heat capacity per unit area of the carbon nanotube structure 100 is low, the field emission device 10 has a high heating response speed.

Figure 23:
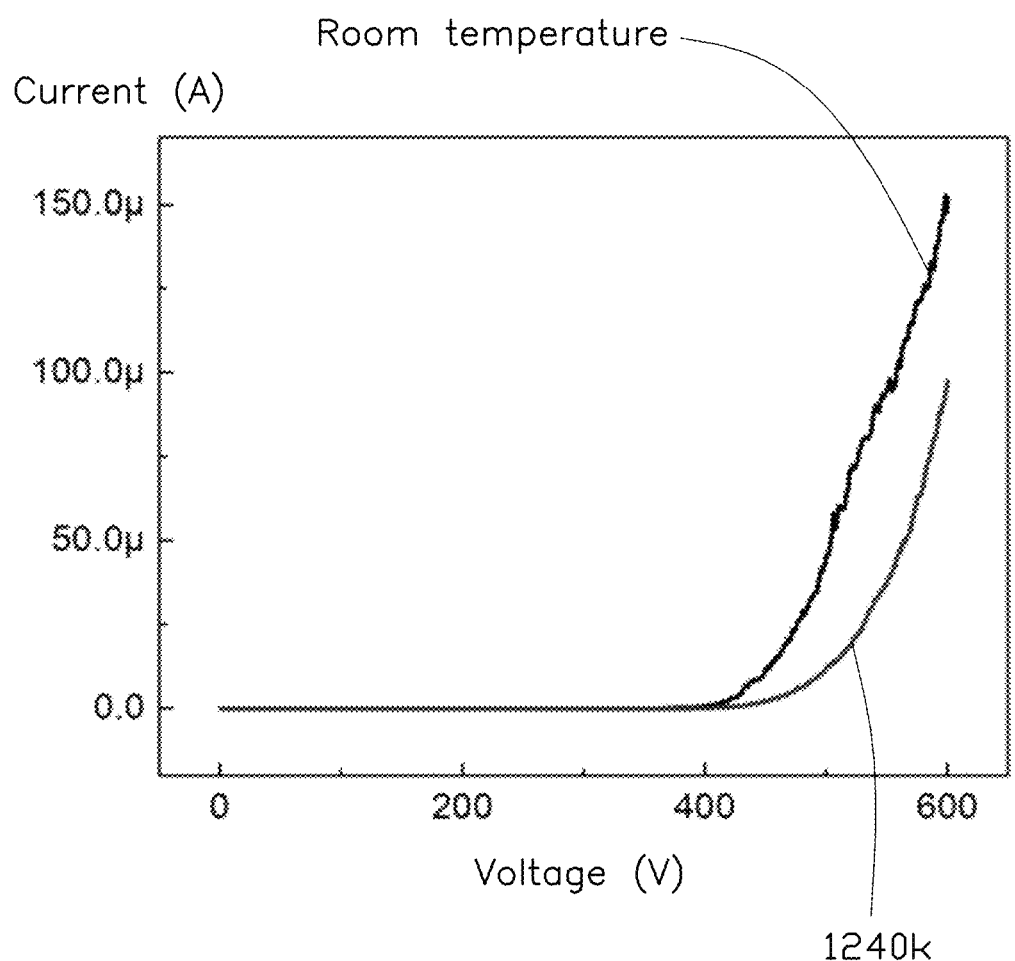
FIGS. 23-26 are testing results of the field emission device of FIG. 22.
Figure 24:
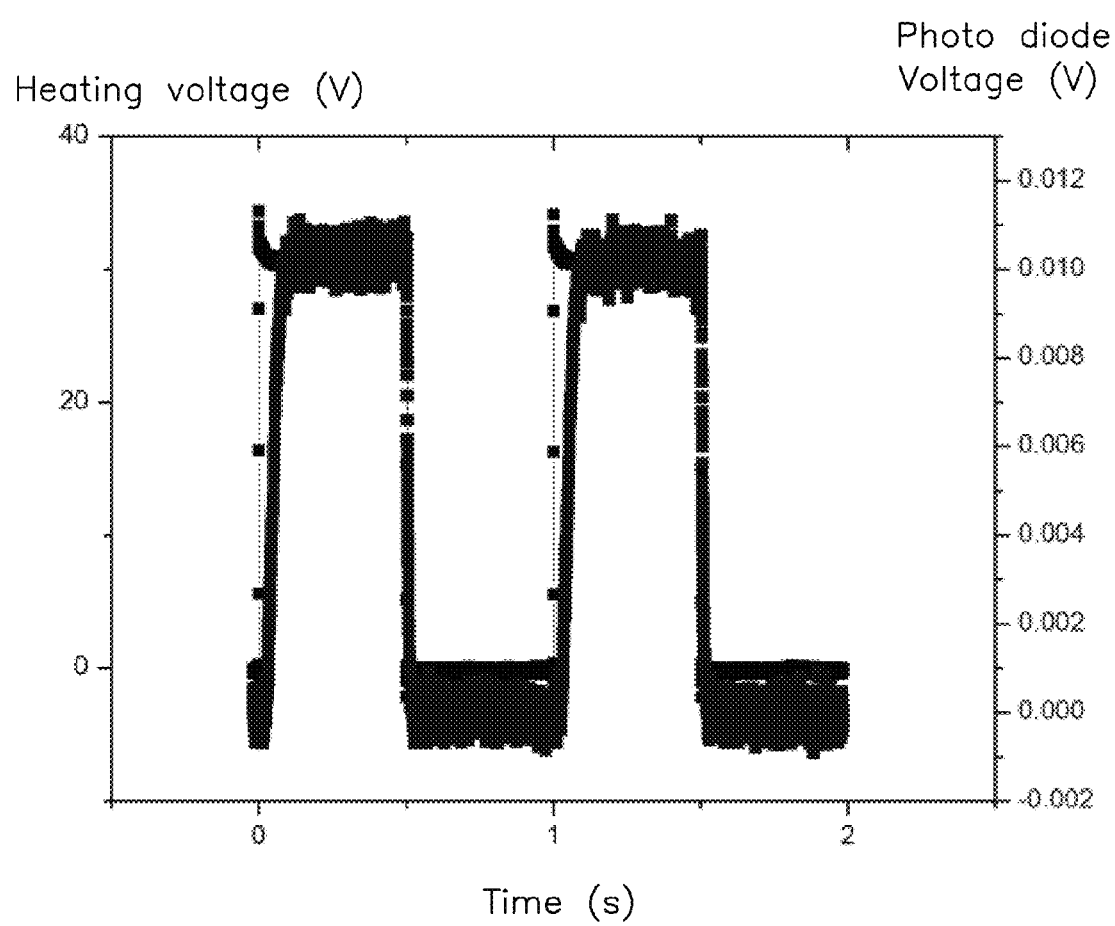
Figure 25:
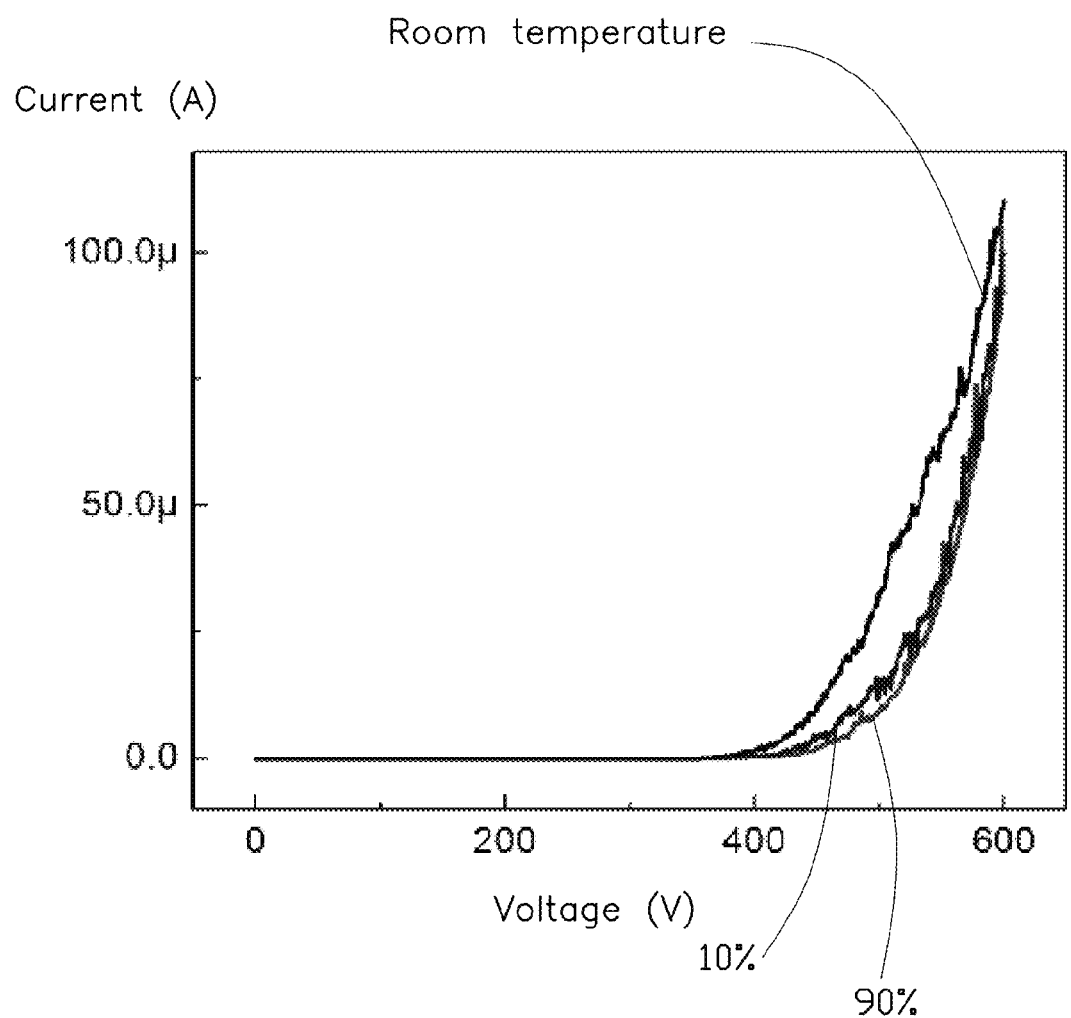
Figure 26:
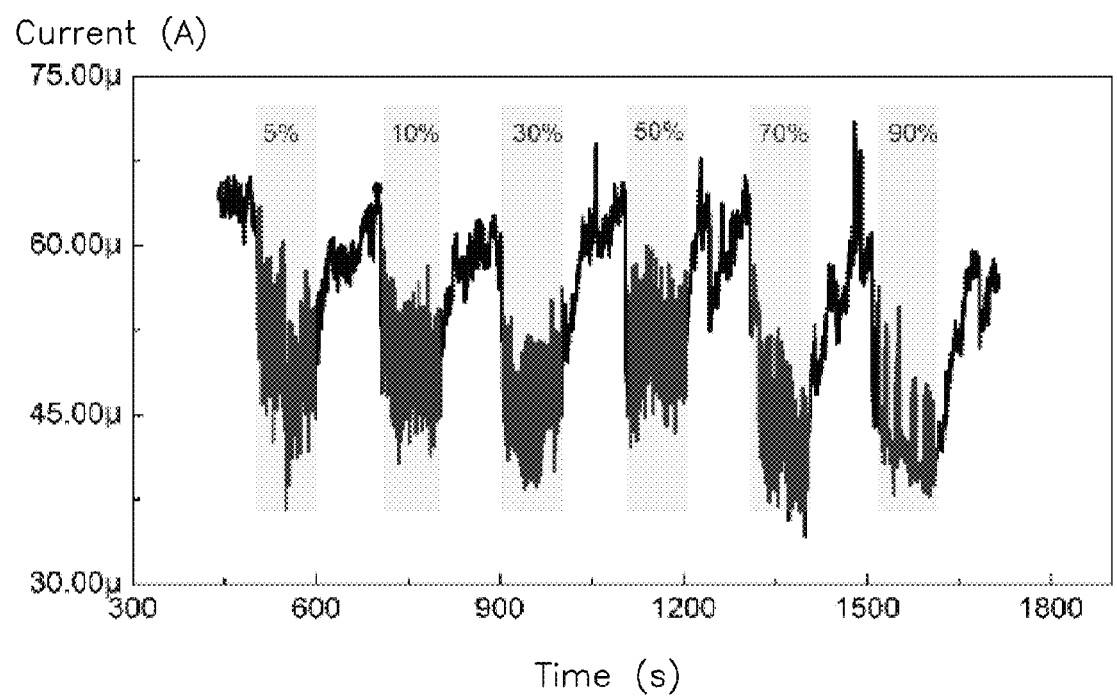

In one embodiment, the carbon nanotube structure 100 is heated by pulsed heating signal. FIGS. 23-26 show the testing results of the field emission device 10 of FIG. 22. The field emission device 10 is tested at room temperature and 1240K respectively. The testing sample carbon nanotube structure 100 has a length of about 8 millimeters, a width of about 2 millimeters, a length of about 100 micrometers, and a resistance of about 400 ohms As shown in FIG. 23, the field emission device 10 can form a field emission current under a voltage of about 400V at room temperature or at 1240K. The field emission current at 1240K is a smooth curve indicates that the field emission current at 1240K is more stable. As shown in FIG. 24, the temperature of the testing sample can ramp up 1193K in 84 milliseconds when a pulsed heating signal is applied and cool down to room temperature in 42 milliseconds when the pulsed heating signal is stop. The pulsed heating voltage is about 30.8V and the pulsed heating temperature is about 1193K. The pulsed heating duty ratio of 5%, 10%, 30%, 50%, 70%, and 90% are used respectively. The pulsed heating duty ratio is a ratio t/T between a time width "t" of the pulsed heating signal and a time cycle "T" of the pulsed heating signal. As shown in FIGS. 25-26, the pulsed heating duty ratio of 5% is enough to cause obvious desorption. The field emission device 10 can achieve a stable adsorbent-free field emission with a heating power of about 0.3 W at pulsed heating duty ratio of 10%.

Figure 27:
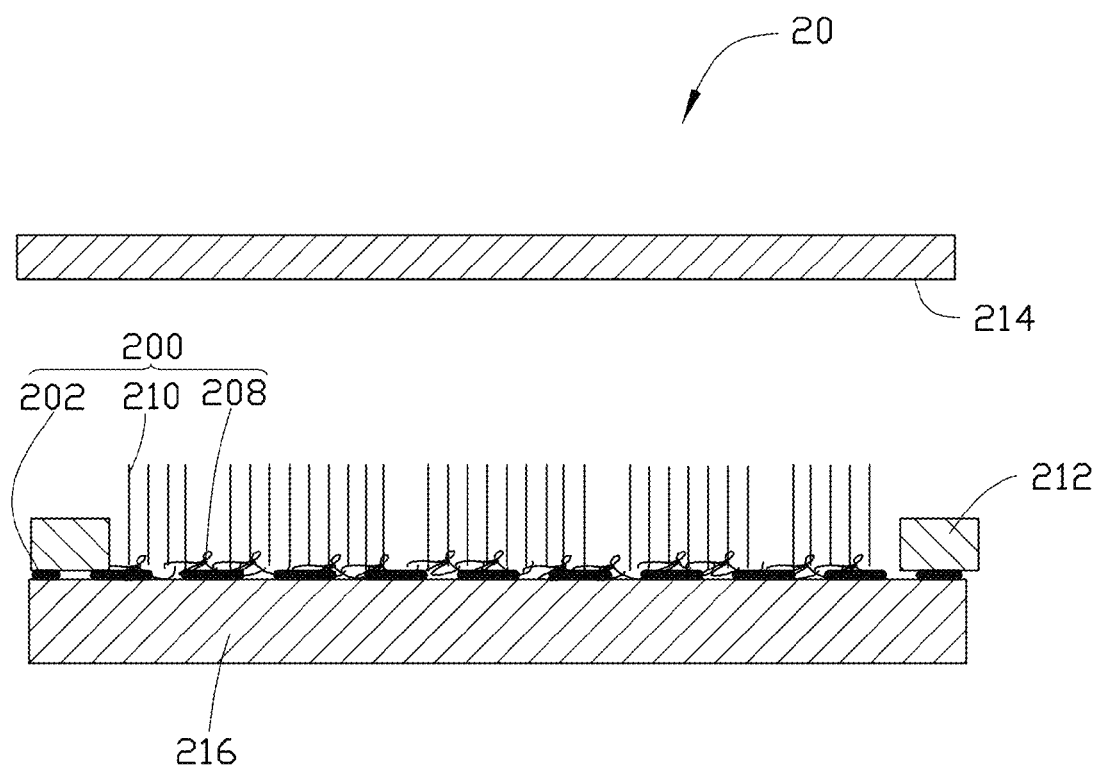
FIG. 27 is a schematic view of one embodiment of a field emission device using the carbon nanotube structure of FIG. 9.

Referring to FIG. 27, a field emission device 20 using the carbon nanotube structure 200 of one embodiment includes an insulative substrate 216, the carbon nanotube structure 200 located on the insulative substrate 216, two electrodes 212 electrically connected with the carbon nanotube structure 200, and an anode electrode 214 spaced from the carbon nanotube structure 200. The carbon nanotube structure 200 includes the patterned carbon nanotube array 210, the carbon nanotube cluster 208, and the carbon nanotube layer 202. The carbon nanotube structure 200 can be replaced by the carbon nanotube structure 100, the carbon nanotube structure 300, or the carbon nanotube structure 400.

The field emission device 20 is similar to the field emission device 10 described above except that the carbon nanotube structure 200 is located on the insulative substrate 216. In one embodiment, the carbon nanotube layer 202 is in contact with the insulative substrate 216, the two electrodes 212 are located on the carbon nanotube structure 200, and parts of the carbon nanotube structure 200 are located between the two electrodes 212 and the insulative substrate 216 so that the carbon nanotube structure 200 is fixed on the insulative substrate 216 firmly.

Figure 28:
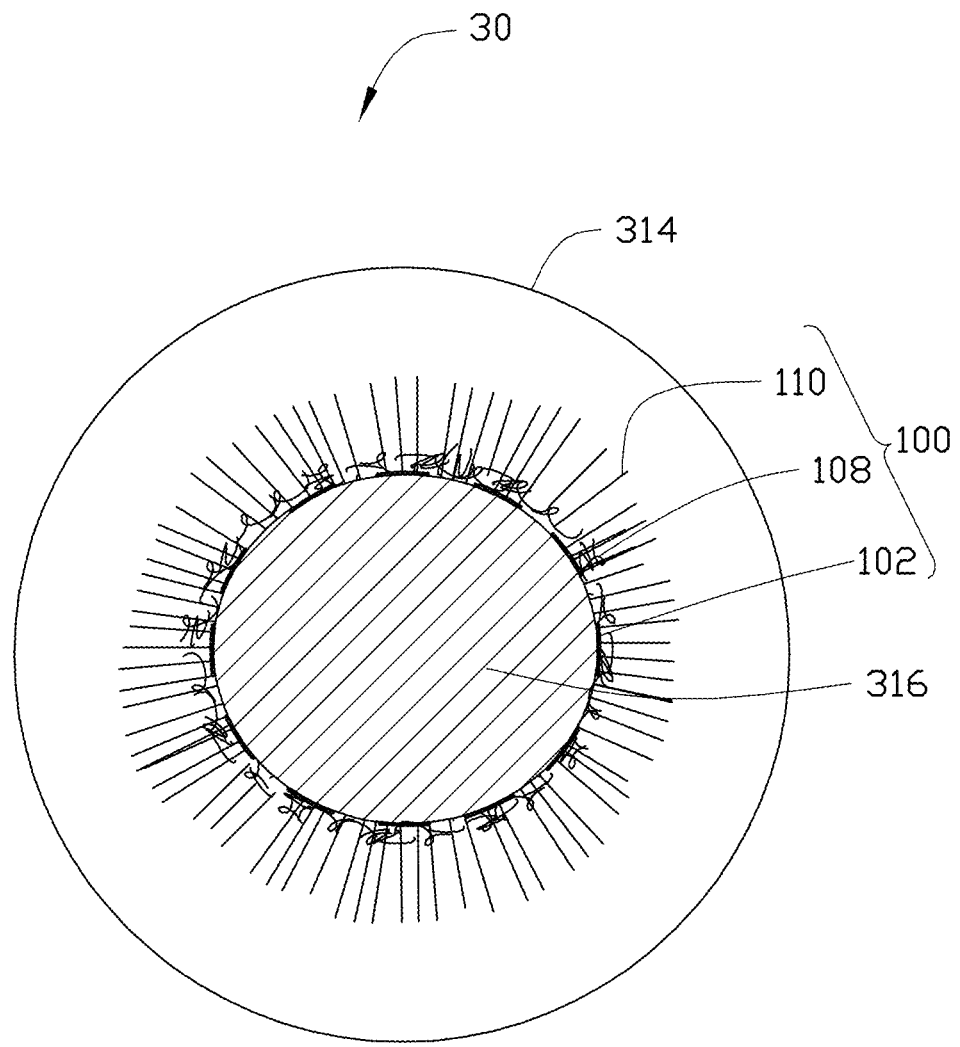
FIG. 28 is a schematic view of one embodiment of a field emission device using the carbon nanotube structure of FIG. 9.

Referring to FIG. 28, a field emission device 30 using the carbon nanotube structure 100 of one embodiment includes a column shaped substrate 316, the carbon nanotube structure 100 located on the column shaped substrate 316, and an anode electrode 314 spaced from the carbon nanotube structure 100.

The field emission device 30 is similar to the field emission device 20 described above except that the substrate 316 is column shaped. The carbon nanotube structure 100 is located around the outer surface of the column shaped substrate 316. The anode electrode 314 is a hollow tube around the carbon nanotube structure 100. The substrate 316 can be a cylinder, a triangular prism, or a quadrangular prism. The sectional shape of the anode electrode 314 can be triangular, circular, or square. In one embodiment, the substrate 316 is a ceramic cylinder; the carbon nanotube structure 100 is located around and in contact with the outer surface of the substrate 316; and the anode electrode 314 is quartz tube with an ITO layer on the inner or outer surface. The carbon nanotubes of the carbon nanotube array 110 extend from the substrate 316 to the anode electrode 314, along an extending direction that is perpendicular with the surface of the anode electrode 314. Because the carbon nanotube structure 100 is flexible, the carbon nanotube structure 100 can be located on the surface in any shape. Furthermore, the field emission device 30 can include two electrodes located on two ends of the substrate 316 and electrically connected with the carbon nanotube structure 100.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A field emission device comprising:
    a carbon nanotube structure; and
    two electrodes electrically connected with the carbon nanotube structure, wherein the carbon nanotube structure comprises:
        a carbon nanotube array, wherein the carbon nanotube array comprises a plurality of first carbon nanotubes that are parallel to each other;
        a carbon nanotube layer located on one side of the carbon nanotube array, wherein the carbon nanotube layer comprises a plurality of second carbon nanotubes in contact with a first portion of each of the plurality of first carbon nanotubes; and
        a plurality of third carbon nanotubes entangled and located between the carbon nanotube layer and the carbon nanotube array.

2. The field emission device of claim 1, wherein the carbon nanotube layer comprises a drawn carbon nanotube film, and the plurality of second carbon nanotubes are arranged substantially along the same direction.

3. The field emission device of claim 2, wherein the plurality of second carbon nanotubes are successive and joined end-to-end by van der Waals attractive force therebetween.

4. The field emission device of claim 2, wherein the carbon nanotube layer comprises two stacked drawn carbon nanotube films, an angle between the arranged directions of the plurality of second carbon nanotubes in two adjacent drawn carbon nanotube films is about 90 degrees.

5. The field emission device of claim 1, wherein the carbon nanotube layer comprises a flocculated carbon nanotube film, and the plurality of second carbon nanotubes are entangled with each other.

6. The field emission device of claim 1, wherein the carbon nanotube layer comprises a pressed carbon nanotube film, and an angle between a primary alignment direction of the plurality of second carbon nanotubes and a surface of the pressed carbon nanotube film is in a range of about 0 degrees to approximately 15 degrees.

7. The field emission device of claim 1, wherein the plurality of third carbon nanotubes and the first portions of the plurality of first carbon nanotubes are entangled with each other.

8. The field emission device of claim 1, wherein the plurality of third carbon nanotubes and the first portions of the plurality of first carbon nanotubes extend around the plurality of second carbon nanotubes.

9. The field emission device of claim 1, wherein the plurality of third carbon nanotubes are entangled around both the plurality of first carbon nanotubes and the plurality of second carbon nanotubes.

10. The field emission device of claim 1, wherein each of the plurality of third carbon nanotubes has a first part entangled around the plurality of first carbon nanotubes and a second part entangled around the plurality of second carbon nanotubes.

11. The field emission device of claim 1, wherein the first portions of the plurality of first carbon nanotubes are entangled around the plurality of second carbon nanotubes.

12. The field emission device of claim 1, wherein the carbon nanotube array is a patterned structure.

13. The field emission device of claim 1, wherein the carbon nanotube structure is free-standing structure, and a part of the carbon nanotube structure is suspended between the two electrodes.

14. The field emission device of claim 1, further comprising an insulative substrate, and the carbon nanotube structure is located on the insulative substrate.

15. The field emission device of claim 1, further comprising an anode electrode spaced from the carbon nanotube structure.

16. The field emission device of claim 1, further comprising a gate electrode spaced from the carbon nanotube structure.

17. A field emission device, comprising:
a substrate;
a carbon nanotube structure located on the substrate; and
an anode electrode spaced from the carbon nanotube structure;
wherein the carbon nanotube structure comprises:
- a carbon nanotube array, wherein the carbon nanotube array comprises a plurality of first carbon nanotubes that are parallel to each other;
- a carbon nanotube layer located on one side of the carbon nanotube array, wherein the carbon nanotube layer comprises a plurality of second carbon nanotubes in contact with a first portion of each of the plurality of first carbon nanotubes; and
- a plurality of third carbon nanotubes entangled and located between the carbon nanotube layer and the carbon nanotube array.

18. The field emission device of claim 17, wherein the substrate is column shaped, the carbon nanotube structure is around an outer surface of the substrate, and the anode electrode is a hollow tube around the carbon nanotube structure.

19. The field emission device of claim 18, wherein the plurality of first carbon nanotubes extend from the outer surface of the substrate to the anode electrode with an extending direction perpendicular with an inner surface of the hollow tube.

20. The field emission device of claim 17, further comprising two electrodes electrically connected with the carbon nanotube structure.

* * * * *